United States Patent
Liu et al.

(10) Patent No.: US 11,159,288 B2
(45) Date of Patent: Oct. 26, 2021

(54) REFERENCE SIGNAL TRANSMISSION MAPPING RULE, RELATED DEVICE, AND COMMUNICATIONS SYSTEM

(71) Applicant: Huawei Technologies Co., Ltd., Shenzhen (CN)

(72) Inventors: Yong Liu, Shanghai (CN); Xiaoyan Bi, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 132 days.

(21) Appl. No.: 16/265,791

(22) Filed: Feb. 1, 2019

(65) Prior Publication Data
US 2019/0173641 A1  Jun. 6, 2019

Related U.S. Application Data

(63) Continuation of application No. PCT/CN2017/083821, filed on May 10, 2017.

(30) Foreign Application Priority Data

Aug. 5, 2016 (CN) .......................... 201610642166.2

(51) Int. Cl.
*H04L 5/00* (2006.01)
*H04L 1/00* (2006.01)
(Continued)

(52) U.S. Cl.
CPC .............. *H04L 5/0048* (2013.01); *H04L 1/00* (2013.01); *H04L 1/0026* (2013.01);
(Continued)

(58) Field of Classification Search
CPC ... H04L 5/0007; H04L 5/0048; H04L 5/0051; H04L 1/00; H04L 1/0026; H04W 72/044;
(Continued)

(56) References Cited

U.S. PATENT DOCUMENTS 8,027,372 B2   9/2011  Khandekar et al.
2015/0230211 A1*  8/2015  You ..................... H04W 72/04
                                                      370/330
(Continued)

FOREIGN PATENT DOCUMENTS

CN    102857459       1/2013
WO    2015070635 A1   5/2015
(Continued)

OTHER PUBLICATIONS

Ericsson, "5G Radio Access", 5GIG#5, Seoul, 40 pages (Aug. 2015).
(Continued)

*Primary Examiner* — Jenee Holland
(74) *Attorney, Agent, or Firm* — Leydig, Voit & Mayer, Ltd.

(57) ABSTRACT

A reference signal transmission method, a related device, and a communications system are provided. The method includes: determining a time-frequency resource occupied by at least one reference signal in at least one resource unit, where each of the at least one resource unit includes a first part and a second part, the first part and the second part occupy different symbols, any symbol occupied by the first part is in front of any symbol occupied by the second part; and sending the reference signal by using the determined time-frequency resource. According to the embodiments of the present invention, a receive end device can be more time-effective during data demodulation.

18 Claims, 16 Drawing Sheets

(51) Int. Cl.
*H04W 72/04* (2009.01)
*H04W 72/08* (2009.01)
*H04W 72/12* (2009.01)

(52) U.S. Cl.
CPC ......... *H04L 5/0051* (2013.01); *H04W 72/044* (2013.01); *H04L 5/0007* (2013.01)

(58) Field of Classification Search
CPC ........... H04W 72/046; H04W 72/0453; H04W 72/0466; H04W 72/0473; H04W 72/005; H04W 72/0051; H04W 72/0446; H04B 17/24
See application file for complete search history.

(56) References Cited

U.S. PATENT DOCUMENTS

| | | | |
|---|---|---|---|
| 2015/0280876 A1 | 10/2015 | You et al. | |
| 2016/0080948 A1* | 3/2016 | Lee | H04W 72/0453 370/329 |
| 2016/0254869 A1 | 9/2016 | Wen et al. | |
| 2017/0078006 A1 | 3/2017 | Liu et al. | |

FOREIGN PATENT DOCUMENTS

| | | |
|---|---|---|
| WO | 2015188355 A1 | 12/2015 |
| WO | 2016107430 A1 | 7/2016 |

OTHER PUBLICATIONS

"Main components for forward compatible frame structure design in NR," 3GPP TSG-RAN WG1 #85, Nanjing, P.R. China, R1-165029, XP051096684, 3rd Generation Partnership Project, Valbonne, France (May 23-27, 2016).

"Discussion on Design of Reference Signals for NR MIMO," 3GPP TSG-RAN WG1 #85, Nanjing, P.R. China, R1-165037, XP051096288, 3rd Generation Partnership Project, Valbonne, France (May 23-27, 2016).

"3rd Generation Partnership Project; Technical Specification Group Radio Access Network; Evolved Universal Terrestrial Radio Access (E-UTRA); Physical channels and modulation (Release 13)," 3GPP TS 36.211 V13.2.0, pp. 1-168, XP051123204, 3rd Generation Partnership Project, Valbonne, France (Jun. 2016).

* cited by examiner

REFERENCE SIGNAL TRANSMISSION MAPPING RULE, RELATED DEVICE, AND COMMUNICATIONS SYSTEM

CROSS-REFERENCE TO RELATED APPLICATIONS

This application is a continuation of International Application No. PCT/CN2017/083821, filed on May 10, 2017, which claims priority to Chinese Patent Application No. 201610642166.2, filed on Aug. 5, 2016. The disclosures of the aforementioned applications are hereby incorporated by reference in their entireties.

TECHNICAL FIELD

Embodiments of the present invention relate to the field of communications technologies, and in particular, to a reference signal transmission method, a related device, and a communications system.

BACKGROUND

With rapid development of communications technologies, a modern communications system has been mainly characterized by a high speed, a large capacity, and wide coverage, and multi-carrier modulation technologies represented by a multiple-input multiple-output (MIMO for short) technology and orthogonal frequency division multiplexing (OFDM for short) stand out. The MIMO technology uses a resource in space dimension to enable a signal to obtain an array gain, multiplexing and diversity gains, and a co-channel interference cancellation gain in space without increasing system bandwidth, thereby increasing a capacity and spectral efficiency of the communications system in multiples. Therefore, the MIMO technology has been favored by people since emergence of the MIMO technology. For example, in a Long Term Evolution (LTE for short) system, the system may use a plurality of antennas on a transmit end device and a receive end device to support transmission up to 8 layers. However, as people have higher communication requirements such as a high speed, high reliability, and a low delay, the modern communications system always faces challenges for a larger capacity, wider coverage and a lower delay. These requirements are also key requirements on a 5G new radio (NR for short) technology.

In a demodulation process of the receive end device of the communications system, compared with incoherent demodulation, coherent demodulation delivers better performance, and has an advantage of approximately 3 dB. Therefore, the coherent demodulation is more widely used by the modern communications system. However, modulation performed on each carrier by an OFDM system is carrier suppression. The coherent demodulation of the receive end device needs a reference signal which is also referred to as a pilot signal or a reference signal (RS for short), and reference signals are distributed on different resource elements (RE for short) in time-frequency two-dimensional space in an OFDM symbol, and have known amplitudes and phases. Likewise, in a MIMO system, each transmit antenna (a virtual antenna or a physical antenna) has an independent data channel. A receiver performs channel estimation for each transmit antenna based on a known RS signal, and restores transmitted data based on the channel estimation. To implement data demodulation of a higher-order multiple-antenna system, a Long Term Evolution Advanced (LTE-A for short) system defines a demodulation reference signal (DMRS for short), and the DMRS is used for demodulation of a physical downlink shared channel (PDSCH for short). In an existing standard, the DMRS is distributed in each physical resource block (PRB for short) in a block pilot form. For example, in an existing LTE-A standard, single user (SU for short) MIMO supports up to 8-layer orthogonal DMRS multiplexing. In other words, a system is capable of simultaneously multiplexing up to 8 data transmission flows. FIG. 1 is a pilot pattern of an 8-layer orthogonal DMRS. In FIG. 1, eight flows are represented by numbers 0 to 7. The 8-layer DMRSs are distributed in the first, the second, the sixth, the seventh, the eleventh, and the twelve subcarriers of each PRB pair in frequency domain, and in the sixth, the seventh, the thirteenth, and the fourteenth symbols of each subframe in time domain.

However, as a new requirement of an NR system is proposed, a new frame structure may be used in some scenarios. For example, as an ultra-low delay key indicator is proposed, a self-contained frame structure emerges, and a main feature of the self-contained frame structure is faster interaction between uplink transmission and down transmission, and the downlink transmission and uplink feedback are completed at the same time and in a same transmission time interval (TTI for short). This means that downlink transmission demodulation decoding is completed before the uplink feedback. In addition, it can be learned from the foregoing description that the DMRS in the existing standard is distributed in each PRB pair in the block pilot form, and a mapping location includes a last symbol. Consequently, mapping of the existing DMRS cannot meet a requirement of the new frame structure.

Therefore, how to design and formulate a new DMRS mapping rule based on the new frame structure or a low-delay scenario becomes an urgent problem to be solved in an NR MIMO system.

SUMMARY

Embodiments of the present invention provide a reference signal transmission method, a related device, and a communications system. A plurality of demodulation reference signals are centrally mapped on a resource unit, and a mapping location of a reference signal is in front of a mapping location of a data signal, so that a receive end device can be more time-effective during data demodulation.

According to a first aspect, an embodiment of the present invention provides a reference signal transmission method. The method includes: determining, by a transmit end device, a time-frequency resource occupied by at least one reference signal in at least one resource unit, where each of the at least one resource unit includes a first part and a second part, the first part and the second part occupy different symbols, any symbol occupied by the first part is in front of any symbol occupied by the second part, the time-frequency resource is located in a single symbol or a plurality of consecutive symbols in the first part, the second part carries a data signal corresponding to each of the at least one reference signal, and each reference signal is used to demodulate the data signal corresponding to the reference signal; and sending, by the transmit end device, the reference signal to a receive end device by using the determined time-frequency resource.

By performing the foregoing steps, a plurality of demodulation reference signals are centrally mapped on the resource unit, and a mapping location of the reference signal is in front of a mapping location of the data signal. This is more suitable for a low-delay frame structure in NR. This design scheme allows data demodulation to be more time-effective.

With reference to the first aspect, in a first implementation of the first aspect, the time-frequency resource includes a plurality of time-frequency units; and after the transmit end device determines the time-frequency resource occupied by the at least one reference signal in the at least one resource unit, before the transmit end device sends the reference signal to the receive end device by using the determined time-frequency resource, the method further includes:

configuring, by the transmit end device, the at least one reference signal on the time-frequency resource based on a quantity of time-frequency units that carry each reference signal.

The method further includes: sending, by the transmit end device, indication information to the receive end device, and the indication information is used by the receive end device to determine the quantity of time-frequency units that carry each of the at least one reference signal on the time-frequency resource.

With reference to the first implementation of the first aspect, in a second implementation of the first aspect, the sending, by the transmit end device, indication information to the receive end device includes: adding, by the transmit end device, the indication information to a radio resource control (RRC for short) message, and sending, to the receive end device, the RRC message to which the indication information is added; or adding, by the transmit end device, the indication information to downlink control information (DCI for short), and sending, to the receive end device, the DCI to which the indication information is added.

According to a second aspect, an embodiment of the present invention provides a reference signal transmission method. The method includes:

receiving, by a receive end device by using a time-frequency resource, a reference signal that is corresponding to the receive end device and that is sent by a transmit end device, where the time-frequency resource is a time-frequency resource occupied by at least one reference signal in at least one resource unit, each of the at least one resource unit includes a first part and a second part, the first part and the second part occupy different symbols, any symbol occupied by the first part is in front of any symbol occupied by the second part, the time-frequency resource is located in a single symbol or a plurality of consecutive symbols in the first part, the second part carries a data signal corresponding to each of the at least one reference signal, and each reference signal is used to demodulate the data signal corresponding to the reference signal; and demodulating, by the receive end device, the data signal corresponding to the reference signal based on the reference signal corresponding to the receive end device.

By performing the foregoing steps, a plurality of demodulation reference signals are centrally mapped on the resource unit, and a mapping location of the reference signal is in front of a mapping location of the data signal. This is more suitable for a low-delay frame structure in NR. This design scheme allows data demodulation to be more time-effective.

With reference to the second aspect, in a first implementation of the second aspect, the time-frequency resource includes a plurality of time-frequency units. The method further includes: receiving, by the receive end device, indication information sent by the transmit end device, and the indication information is used to determine a quantity of time-frequency units that carry each of the at least one reference signal on the time-frequency resource.

With reference to the first implementation of the second aspect, in a second implementation of the second aspect, the receiving, by the receive end device, indication information sent by the transmit end device includes: receiving, by the receive end device, the indication information that is sent by the transmit end device by using an RRC message or DCI.

According to a third aspect, an embodiment of the present invention provides a transmit end device. The transmit end device includes a processor, a memory, and a communications module, the memory is configured to store program code for transmitting a reference signal, and the processor is configured to invoke the program code for transmitting a reference signal, to perform the following operations:

determining a time-frequency resource occupied by at least one reference signal in at least one resource unit, where each of the at least one resource unit includes a first part and a second part, the first part and the second part occupy different symbols, any symbol occupied by the first part is in front of any symbol occupied by the second part, the time-frequency resource is located in a single symbol or a plurality of consecutive symbols in the first part, the second part carries a data signal corresponding to each of the at least one reference signal, and each reference signal is used to demodulate the data signal corresponding to the reference signal; and sending the reference signal to a receive end device by using the determined time-frequency resource and by using the communications module.

By performing the foregoing operations, a plurality of demodulation reference signals are centrally mapped on the resource unit, and a mapping location of the reference signal is in front of a mapping location of the data signal. This is more suitable for a low-delay frame structure in NR. This design scheme allows data demodulation to be more time-effective.

With reference to the third aspect, in a first implementation of the third aspect, the time-frequency resource includes a plurality of time-frequency units; and after the processor determines the time-frequency resource occupied by the at least one reference signal in the at least one resource unit, before sending the reference signal to the receive end device by using the determined time-frequency resource and by using the communications module, the processor is further configured to:

configure the at least one reference signal on the time-frequency resource based on a quantity of time-frequency units that carry each reference signal.

The processor is further configured to send indication information to the receive end device by using the communications module, and the indication information is used by the receive end device to determine the quantity of time-frequency units that carry each of the at least one reference signal on the time-frequency resource.

With reference to the first implementation of the third aspect, in a second implementation of the third aspect, that the processor sends indication information to the receive end device by using the communications module includes: adding, by the processor, the indication information to an RRC message by using the communications module, and sending, to the receive end device, the RRC message to which the indication information is added; or adding, by the processor, the indication information to DCI by using the communications module, and sending, to the receive end device, the DCI to which the indication information is added.

According to a fourth aspect, an embodiment of the present invention provides a receive end device. The receive end device includes a processor, a memory, and a communications module, the memory is configured to store program code for transmitting a reference signal, and the processor is configured to invoke the program code for transmitting a reference signal, to perform the following operations:

receiving, by using a time-frequency resource and by using the communications module, a reference signal that is corresponding to the receive end device and that is sent by a transmit end device, where the time-frequency resource is a time-frequency resource occupied by at least one reference signal in at least one resource unit, each of the at least one resource unit includes a first part and a second part, the first part and the second part occupy different symbols, any symbol occupied by the first part is in front of any symbol occupied by the second part, the time-frequency resource is located in a single symbol or a plurality of consecutive symbols in the first part, the second part carries a data signal corresponding to each of the at least one reference signal, and each reference signal is used to demodulate the data signal corresponding to the reference signal; and demodulating the data signal corresponding to the reference signal based on the reference signal corresponding to the receive end device.

By performing the foregoing operations, a plurality of demodulation reference signals are centrally mapped on the resource unit, and a mapping location of the reference signal is in front of a mapping location of the data signal. This is more suitable for a low-delay frame structure in NR. This design scheme allows data demodulation to be more time-effective.

With reference to the fourth aspect, in a first implementation of the fourth aspect, the time-frequency resource includes a plurality of time-frequency units. The processor is further configured to receive, by using the communications module, indication information sent by the transmit end device, and the indication information is used to determine a quantity of time-frequency units that carry each of the at least one reference signal on the time-frequency resource.

With reference to the first implementation of the fourth aspect, in a second implementation of the fourth aspect, the receiving, by using the communications module, indication information sent by the transmit end device includes: receiving, by using the communications module, the indication information that is sent by the transmit end device by using an RRC message or DCI.

According to a fifth aspect, an embodiment of the present invention provides a transmit end device, including modules or units that are configured to perform the reference signal transmission method described in any one of the first aspect or the implementations of the first aspect.

For example, the transmit end device includes a determining unit and a first sending unit.

The determining unit is configured to determine a time-frequency resource occupied by at least one reference signal in at least one resource unit, where each of the at least one resource unit includes a first part and a second part, the first part and the second part occupy different symbols, any symbol occupied by the first part is in front of any symbol occupied by the second part, the time-frequency resource is located in a single symbol or a plurality of consecutive symbols in the first part, the second part carries a data signal corresponding to each of the at least one reference signal, and each reference signal is used to demodulate the data signal corresponding to the reference signal.

The first sending unit is configured to send the reference signal to a receive end device by using the determined time-frequency resource.

The units or the modules included in the transmit end device are not limited to the foregoing naming manner.

According to a sixth aspect, an embodiment of the present invention provides a receive end device, including modules or units that are configured to perform the reference signal transmission method described in any one of the second aspect or the implementations of the second aspect.

For example, the receive end device includes a first receiving unit and a processing unit.

The first receiving unit is configured to receive, by using a time-frequency resource, a reference signal that is corresponding to the receive end device and that is sent by a transmit end device, where the time-frequency resource is a time-frequency resource occupied by at least one reference signal in at least one resource unit, each of the at least one resource unit includes a first part and a second part, the first part and the second part occupy different symbols, any symbol occupied by the first part is in front of any symbol occupied by the second part, the time-frequency resource is located in a single symbol or a plurality of consecutive symbols in the first part, the second part carries a data signal corresponding to each of the at least one reference signal, and each reference signal is used to demodulate the data signal corresponding to the reference signal.

The processing unit is configured to demodulate the data signal corresponding to the reference signal based on the reference signal corresponding to the receive end device.

The units or the modules included in the receive end device are not limited to the foregoing naming manner.

According to a seventh aspect, an embodiment of the present invention provides a communications system, including a transmit end device and a receive end device, where the transmit end device is the transmit end device in the third aspect or the fifth aspect, and the receive end device is the receive end device in the fourth aspect or the sixth aspect.

With reference to any one of the foregoing aspects, in some implementations of the embodiments of the present invention, when the plurality of consecutive symbols carry a plurality of reference signals, at least two reference signals are carried on at least two consecutive symbols in a time division multiplexing (TDM for short) manner.

With reference to any one of the foregoing aspects, in some implementations of the embodiments of the present invention, when the plurality of consecutive symbols carry a plurality of reference signals, at least two reference signals are carried on at least two consecutive symbols in a code division multiplexing (CDM for short) manner.

With reference to any one of the foregoing aspects, in some implementations of the embodiments of the present invention, when the single symbol or each of the plurality of consecutive symbols carries a plurality of reference signals, at least two reference signals are carried on at least two subcarriers in a code division multiplexing manner.

With reference to any one of the foregoing aspects, in some implementations of the embodiments of the present invention, when the single symbol or each of the plurality of consecutive symbols carries a plurality of reference signals, different reference signals occupy different subcarriers on the single symbol or each of the plurality of consecutive symbols.

With reference to any one of the foregoing aspects, in some implementations of the embodiments of the present invention, when the single symbol or each of the plurality of consecutive symbols carries a plurality of reference signals, at least two reference signals are carried on a same subcarrier on the single symbol or each of the plurality of consecutive symbols by using different local sequences.

With reference to any one of the foregoing aspects, in some implementations of the embodiments of the present invention, the time-frequency resource includes a plurality of time-frequency units, and in the time-frequency resource, a quantity of time-frequency units that carry a reference signal of a same active antenna port is associated with a quantity of active antenna ports associated with the time-frequency resource. In the present invention, the quantity of time-frequency units that carry the reference signal of the same active antenna port is adjustable and configurable, and the quantity of time-frequency units that carry the reference signal of the same active antenna port may be set based on the quantity of active antenna ports.

With reference to any one of the foregoing aspects, in some implementations of the embodiments of the present invention, the time-frequency resource includes a plurality of time-frequency units, and in the time-frequency resource, quantities of time-frequency units that carry reference signals of different active antenna ports are the same or different.

With reference to any one of the foregoing aspects, in some implementations of the embodiments of the present invention, the time-frequency resource includes a plurality of time-frequency units, and in the time-frequency resource, a quantity of time-frequency units that carry a reference signal of a same active antenna port is associated with current channel quality of the transmit end device. In the embodiments of the present invention, the quantity of time-frequency units that carry the reference signal of the same active antenna port is adjustable and configurable, and the quantity of time-frequency units that carry the reference signal of the same active antenna port may be set based on the channel quality.

With reference to any one of the foregoing aspects, in some implementations of the embodiments of the present invention, the indication information includes the quantity of time-frequency units that carry each reference signal, an identifier of a pilot pattern, a quantity of reference signals, or a maximum value of an active antenna port sequence number.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

Figure 1:
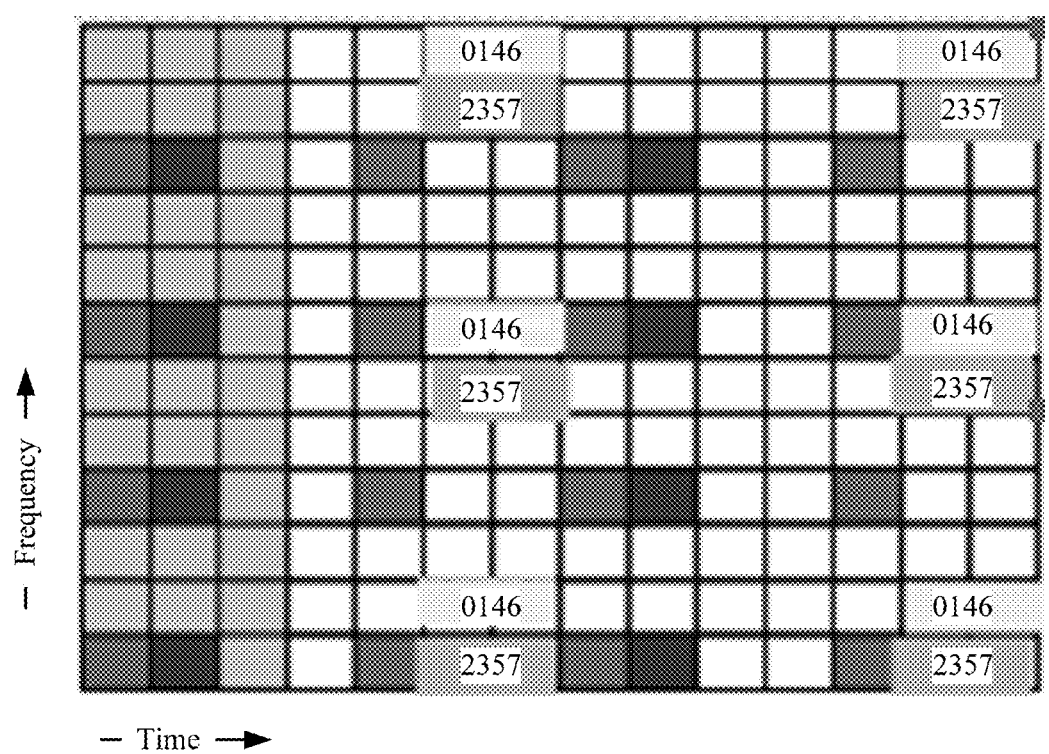
FIG. 1 is a pilot pattern of an 8-layer orthogonal DMRS in a conventional technology.
Figure 2:
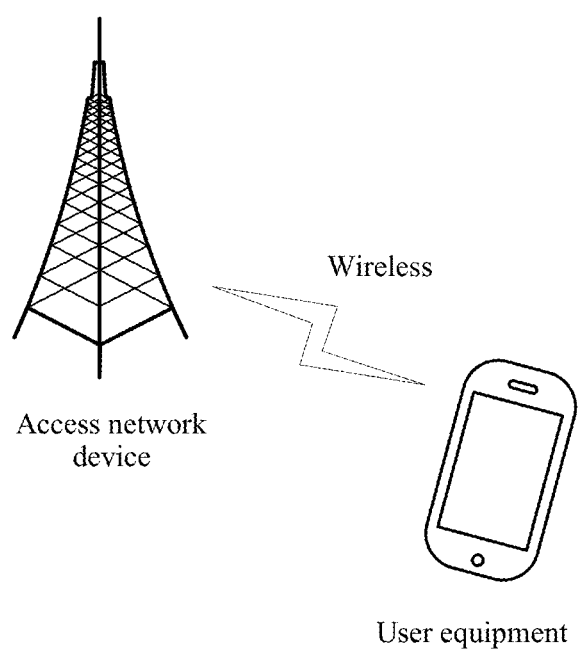
FIG. 2 is a schematic architectural diagram of a communications system according to an embodiment of the present invention.

FIG. 2 is a schematic architectural diagram of a communications system according to an embodiment of the present invention. The communications system includes a transmit end device and a receive end device. In this embodiment of the present invention, an example in which the transmit end device is an access network device and the receive end device is user equipment (UE for short) is used for description. The user equipment and the access network device communicate with each other by using an air interface technology. The air interface technology may include an existing 2G system (such as a Global System for Mobile Communications (GSM for short)), a 3G system (such as a Universal Mobile Telecommunications System (UMTS for short), Wideband Code Division Multiple Access (WCDMA for short), and Time Division-Synchronous Code Division Multiple Access (TD-SCDMA for short), a 4G (such as FDD LTE and TDD LTE) system, and a new radio access technology (New RAT for short) system such as future 4.5G and 5G systems.

The user equipment described in this embodiment of the present invention is described as UE in a general sense. In addition, the user equipment may also be referred to as a mobile console, an access terminal, a subscriber unit, a subscriber station, a mobile station, a remote station, a remote terminal, a mobile device, a user terminal, a terminal, a wireless communications device, a user agent, a user apparatus, or the like. The user equipment may be a cellular phone, a cordless telephone, a Session Initiation Protocol (SIP for short) telephone, a wireless local loop (WLL for short) station, a personal digital assistant (PDA for short), a handheld device with a wireless communication function, a computing device, another processing device connected to a wireless modem, an in-vehicle device, a wearable device, a mobile station in a future 5G network, a terminal device in a future evolved public land mobile network (PLMN for short), or the like. In addition, in this embodiment of the present invention, the user equipment may be another device that can perform data communication with the access network device (such as a base station), such as a relay.

The access network device described in this embodiment of the present invention may be a device configured to communicate with the user equipment. Specifically, in a wireless communications system, the access network device is a device communicating with the user equipment in a wireless manner. For example, the access network device may be a base transceiver station (BTS for short) in a GSM system, may be an NB (NodeB) in a WCDMA system, or may be an evolved NodeB (eNB for short) in LTE, a relay station, an in-vehicle device, a wearable device, an access network device in a future 5G network, or an access network device in a future evolved PLMN network.

To clearly describe the technical solutions in embodiments of the present invention, the following first describes a structure of a resource unit described in the embodiments of the present invention.

Figure 3:
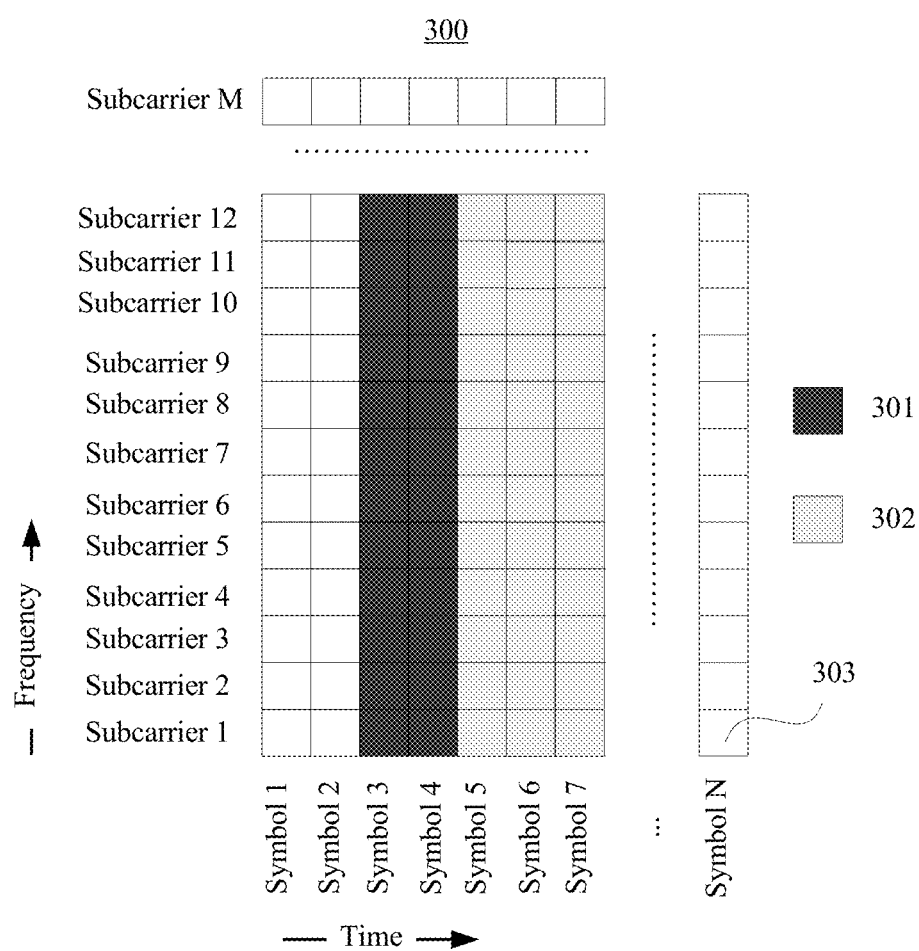
FIG. 3 is a schematic logical structural diagram of a resource unit according to an embodiment of the present invention.

FIG. 3 is a schematic logical structural diagram of a resource unit according to an embodiment of the present invention. The resource unit may be equivalent to a PRB or a PRB pair in an existing LTE system. The resource unit includes N symbols in time domain and M subcarriers in frequency domain, N and M are positive integers, and values of M and N may be set based on a specific requirement. In the following embodiments of the present invention, an example in which M is 12 is used for description. The resource unit 300 includes a first part 301 and a second part 302. The first part 301 includes a single symbol or a group of a plurality of consecutive symbols in time domain and a group of consecutive subcarriers in frequency domain. The second part 302 includes a single symbol or a group of a plurality of consecutive symbols in time domain and a group of consecutive subcarriers in frequency domain. The group of consecutive subcarriers included in the first part 301 and the group of consecutive subcarriers included in the second part 302 may be a same group of consecutive subcarriers, or may be different groups of subcarriers. In FIG. 3, the first part 301 and the second part 302 are carried on the same group of consecutive subcarriers in frequency domain, and the group of subcarriers includes 12 subcarriers.

In addition, this may alternatively be that the first part includes a group of consecutive subcarriers (a subcarrier 1 to a subcarrier 8) in frequency domain, and the second part 302 includes another group of consecutive subcarriers (a subcarrier 4 to a subcarrier 12). The first part 301 and the second part 302 occupy different symbols in time domain. To be specific, the first part 301 and the second part 302 are distinguished from each other in time domain, and any symbol occupied by the first part 301 is in front of any symbol occupied by the second part 302. For example, in FIG. 3, the first part 301 occupies two symbols: a symbol 3 and a symbol 4, the second part 302 occupies three symbols: a symbol 5, a symbol 6, and a symbol 7, and the symbol 3 and the symbol 4 are in front of the symbol 5, the symbol 6, and the symbol 7.

In addition, the first part 301 may alternatively include a single symbol or a group of a plurality of consecutive symbols in time domain and a plurality of inconsecutive subcarriers in frequency domain. Likewise, the second part 302 may alternatively include a single symbol or a group of a plurality of consecutive symbols in time domain and a plurality of inconsecutive subcarriers in frequency domain.

For example, the first part 301 occupies the symbol 3 and the symbol 4, and is carried on the subcarrier 1 to the subcarrier 4 and the subcarrier 6 to the subcarrier 12, and the second part 302 occupies the symbol 5, the symbol 6, and the symbol 7, and is carried on the subcarrier 3 to the subcarrier 8 and the subcarrier 10.

A minimum resource unit in the resource unit 300 is a time-frequency unit such as a time-frequency unit 303. One time-frequency unit may be equivalent to one resource element (RE for short) in an existing LTE system. Each time-frequency unit is carried on one subcarrier in frequency domain and one symbol in time domain.

It should be noted that, for ease of description, the structure of the resource unit 300 shown in FIG. 3 is a structure of a current LTE subframe. However, a person skilled in the art should understand that the resource unit 300 may also be another structure. For example, a quantity of time-frequency units in the resource unit, a quantity of subcarriers in the same group of consecutive subcarriers in the resource unit, a quantity of symbols included in the first part, a quantity of symbols included in the second part, a quantity of subcarriers occupied by the first part, and a quantity of subcarriers occupied by the second part may be set based on a specific requirement.

In specific application, a location of the first part in the resource unit is not limited to a location shown in FIG. 3, a location of the second part in the resource unit is not limited to a location shown in FIG. 3, either, and the first part is only required to be in front of the second part. In other words, locations of the first part and the second part in the resource unit may be set based on a specific requirement. In addition, the first part and the second part may be adjacent, or may not be adjacent. This is not specifically limited in this embodiment of the present invention.

In the resource unit 300, the first part 301 includes a time-frequency resource that carries at least one reference signal. The time-frequency resource occupies a single symbol or a plurality of consecutive symbols in the first part 301, for example, the time-frequency resource occupies a single symbol in the first part 301, such as the symbol 3 or the symbol 4; or the time-frequency resource occupies two consecutive symbols in the first part 301, such as the symbol 3 and the symbol 4. The second part 302 carries a data signal corresponding to each of the at least one reference signal, and each reference signal is used to demodulate the data signal corresponding to the reference signal. The time-frequency resource may include all time-frequency units in the first part 301, or may include only some time-frequency units in the first part 301. For example, in FIG. 3, the time-frequency resource includes one symbol (the symbol 3) in time domain and the 12 subcarriers (the subcarrier 1 to the subcarrier 12) in frequency domain, or the time-frequency resource includes two consecutive symbols (the symbol 3 and the symbol 4) in time domain and the group of consecutive subcarriers (the subcarrier 1 to the subcarrier 8) in frequency domain.

In addition, a time-frequency unit that does not carry a reference signal in the first part 301 may also be used to carry a data signal. For example, the time-frequency resource includes the symbol 3 and the symbol 4 in time domain and 8 consecutive subcarriers (the subcarrier 1 to the subcarrier 8) in frequency domain, and a time-frequency unit (time domain: the symbol 3 and the symbol 4; frequency domain: the subcarrier 9, the subcarrier 10, the subcarrier 11 and the subcarrier 12) other than the time-frequency resource in the first part 301 may carry the data signal, so as to improve resource utilization.

In specific application, a first part 301 of one resource unit 300 may carry one or more reference signals, or a plurality of first parts 301 of a plurality of resource units 300 may carry one or more reference signals. For example, the first part 301 of one resource unit 300 may carry 8 reference signals, or two first parts 301 of two resource units 300 may carry the 8 reference signals.

It should be noted that the symbol in this embodiment of the present invention may further use another naming manner, for example, a time unit. The subcarrier in this embodiment of the present invention may further use another naming manner, for example, a frequency unit. The resource unit in this embodiment of the present invention may further use another naming manner, for example, a transmission unit.

It should be noted that, in the following embodiments, an example in which the first part includes two consecutive symbols (the symbol 3 and the symbol 4) in time domain and 12 consecutive subcarriers (the subcarrier 1 to the subcarrier 12) in frequency domain is used for description, and an example in which the second part includes three consecutive symbols (the symbol 5, the symbol 6, and the symbol 7) in time domain and 12 consecutive subcarriers (the subcarrier 1 to the subcarrier 12) in frequency domain is used for description. However, in another embodiment, the first part may alternatively include 4 consecutive symbols in time domain and 8 consecutive subcarriers in frequency domain, and the second part may alternatively include 4 consecutive symbols in time domain and 8 consecutive subcarriers in frequency domain.

Figure 4:
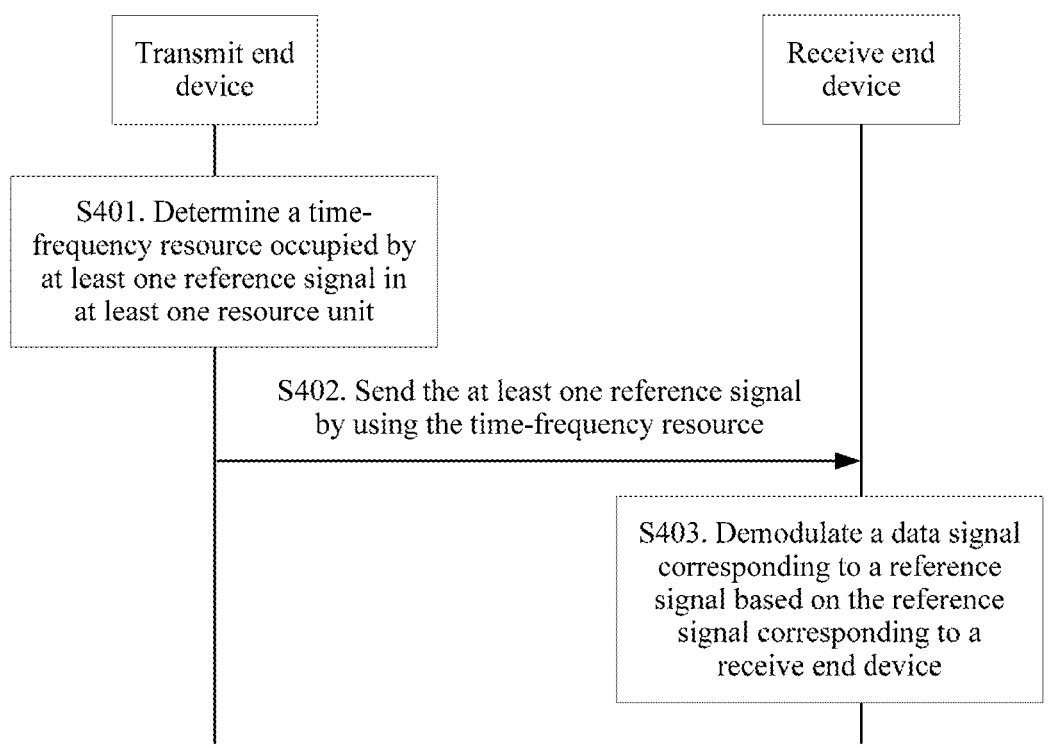
FIG. 4 is a schematic flowchart of a reference signal transmission method according to an embodiment of the present invention.

FIG. 4 is a schematic flowchart of a reference signal transmission method according to an embodiment of the present invention. The method includes but is not limited to the following steps.

S401. A transmit end device determines a time-frequency resource occupied by at least one reference signal in at least one resource unit.

Each of the at least one resource unit includes a first part and a second part, the first part and the second part occupy different symbols, any symbol occupied by the first part is in front of any symbol occupied by the second part, the time-frequency resource is located in a single symbol or a plurality of consecutive symbols in the first part, the second part carries a data signal corresponding to each of the at least one reference signal, and each reference signal is used to demodulate the data signal corresponding to the reference signal. Herein, each of the at least one reference signal is corresponding to an active antenna port; in other words, an active antenna port is corresponding to a reference signal (which may also be referred to as a demodulation reference signal, and the demodulation reference signal is equivalent to a DMRS in an existing LTE system) used to demodulate the data signal. Generally, a quantity of antenna ports used for each data transmission (for example, transmission of each subframe) may be less than a maximum quantity of antenna ports supported by a wireless communications standard. In other words, in each data transmission process, some antenna ports may not be used. For ease of description, an antenna port actually used in each data transmission process is referred to as the active antenna port. For example, although a latest LTE standard supports up to 8 antenna ports, a quantity of antenna ports used for each data transmission may be less than 8. If only 5 antenna ports are used, there are only 5 active antenna ports.

In this embodiment of the present invention, a plurality of demodulation reference signals are centrally mapped on the resource unit, and a mapping location of the reference signal is in front of a mapping location of the data signal. This is more suitable for a low-delay frame structure in NR. This design scheme allows data demodulation to be more time-effective, and in addition, ensures that higher channel estimation precision can be obtained in a new reference signal mapping solution, regardless of a low-speed scenario or a high-speed scenario. In addition, the design scheme in this embodiment of the present invention extends a quantity of active antenna ports. Therefore, the quantity of active antenna ports can be greater than 8, and higher number of data transmission flows can be supported, thereby improving data transmission efficiency.

In specific implementation, the transmit end device may determine a quantity of supported demodulation reference signal layers (which may also be referred to as quantity, types, and orders) based on a network configuration including a quantity of transmit and receive antennas, a channel status, and a channel estimation algorithm of a receive end device, and further generate an independent demodulation reference signal original sequence. The original sequence generation manner includes but is not limited to a Gold sequence, and the transmit end device determines a mapping solution of the reference signal based on a maximum transmission order.

Optionally, when the plurality of consecutive symbols carry a plurality of reference signals, at least two reference signals are carried on at least two consecutive symbols in a TDM manner.

Figure 4A:
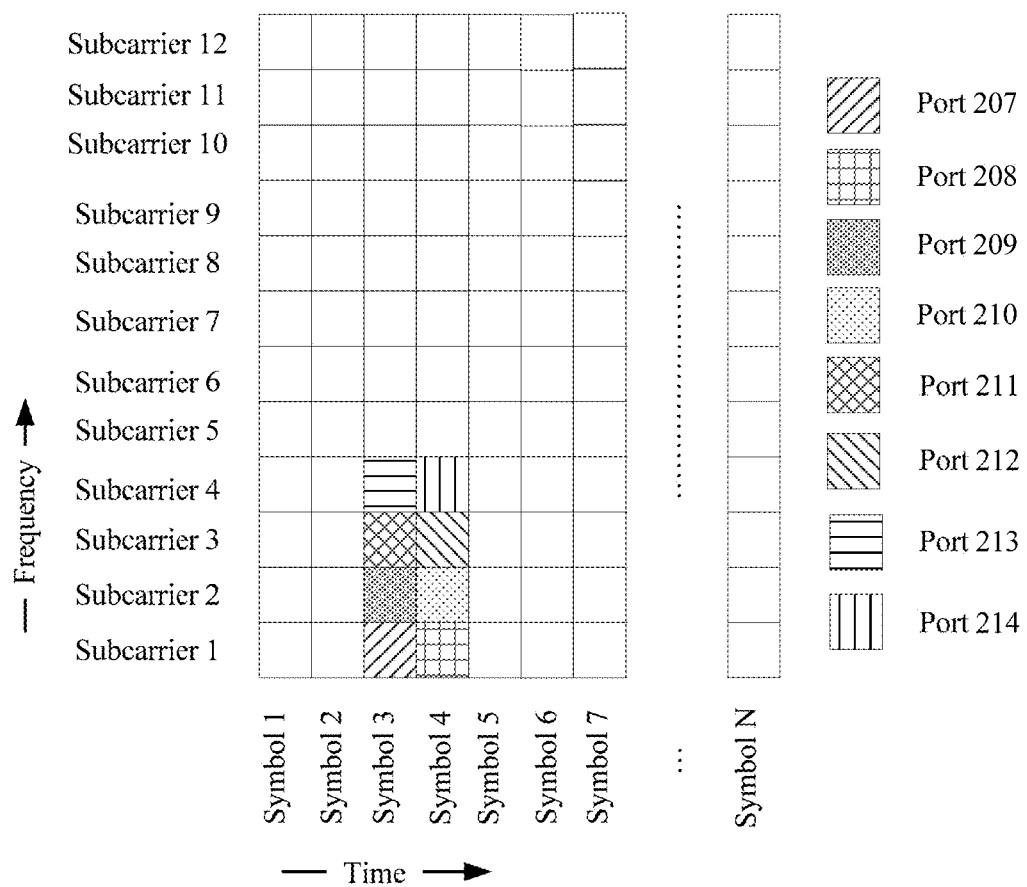
FIG. 4A is a schematic diagram of a pilot pattern of a reference signal according to an embodiment of the present invention.

For example, FIG. 4A is a schematic diagram of a pilot pattern (which may also be referred to as a mapping pattern or a distribution pattern) of a reference signal according to an embodiment of the present invention. In FIG. 4A, the resource unit includes 8 reference signals corresponding to 8 active antenna ports, and port numbers of the 8 active antenna ports are 207, 208, 209, 210, 211, 212, 213, and 214. Different patterns represent time-frequency units occupied by different active antenna ports, and the time-frequency units are configured to carry demodulation reference signals of different active antenna ports. A reference signal of an active antenna port 207 and a reference signal of an active antenna port 208 are carried on a same sub carrier 1 in the TDM manner. A reference signal of an active antenna port 209 and a reference signal of an active antenna port 210 are carried on a same subcarrier 2 in the TDM manner. A reference signal of an active antenna port 211 and a reference signal of an active antenna port 212 are carried on a same subcarrier 3 in the TDM manner. A reference signal of an active antenna port 213 and a reference signal of an active antenna port 214 are carried on a same subcarrier 4 in the TDM manner.

Optionally, when the plurality of consecutive symbols carry a plurality of reference signals, at least two reference signals are carried on at least two consecutive symbols in a CDM manner.

Figure 4B:
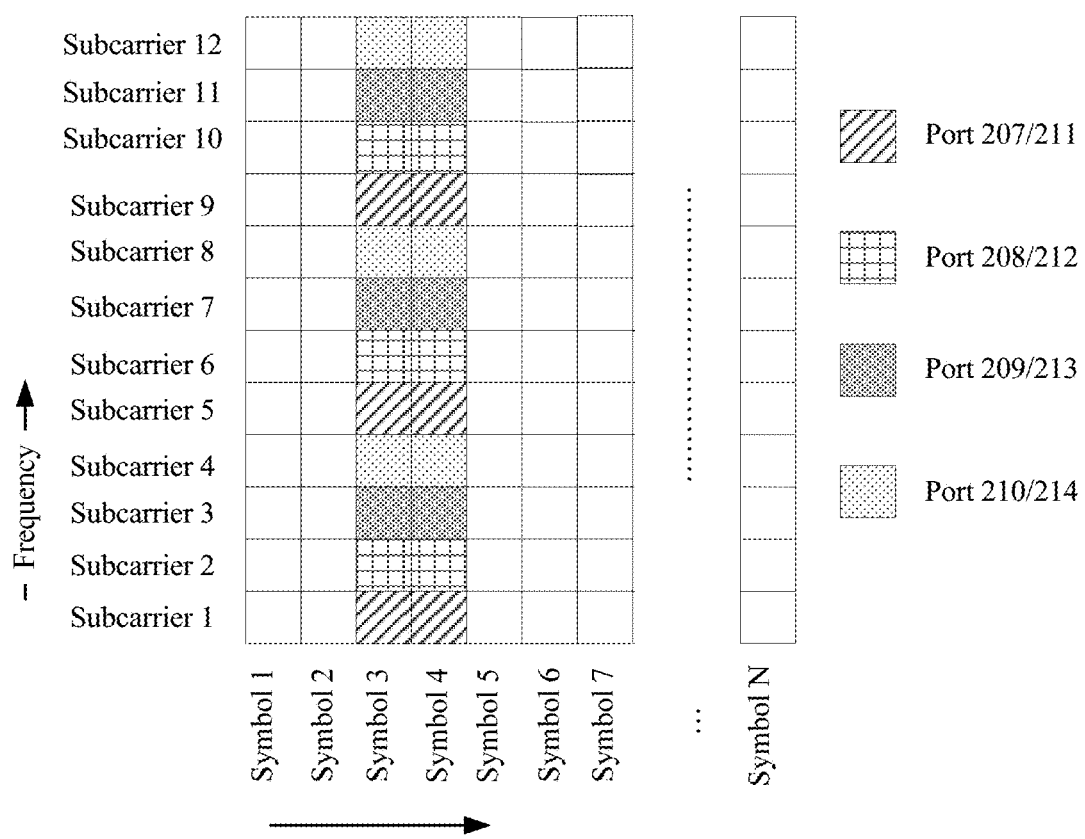
FIG. 4B is a schematic diagram of a pilot pattern of another reference signal according to an embodiment of the present invention.

For example, FIG. 4B is a schematic diagram of a pilot pattern of another reference signal according to an embodiment of the present invention. In FIG. 4B, the resource unit includes 8 reference signals corresponding to 8 active antenna ports, and port numbers of the 8 active antenna ports are 207, 208, 209, 210, 211, 212, 213, and 214. A reference signal of an active antenna port 207 and a reference signal of an active antenna port 211 occupy a same time-frequency unit and are carried on two consecutive symbols (a symbol 3 and a symbol 4) in the CDM manner. Likewise, a reference signal of an active antenna port 208 and a reference signal of an active antenna port 212 occupy a same time-frequency unit and are carried on two consecutive symbols (the symbol 3 and the symbol 4) in the CDM manner. A reference signal of an active antenna port 209 and a reference signal of an active antenna port 213 occupy a same time-frequency unit and are carried on two consecutive symbols (the symbol 3 and the symbol 4) in the CDM manner. A reference signal of an active antenna port 210 and a reference signal of an active antenna port 214 occupy a same time-frequency unit and are carried on two consecutive symbols (the symbol 3 and the symbol 4) in the CDM manner. In addition, the foregoing two consecutive symbols (the symbol 3 and the symbol 4) may further carry more reference signals in the CDM manner.

In addition, in a specific implementation process, an orthogonal cover code (OCC for short) may be used to implement the foregoing code division multiplexing. An orthogonal cover code generation manner includes but is not limited to a Walsh sequence and a fast Fourier transform (FFT for short) generation sequence, and a length of the orthogonal cover code is related to a quantity of reference signals carried in a same time-frequency unit. For example, in the pilot pattern shown in FIG. 4B, the code division multiplexing may be implemented by using an orthogonal cover code with a length of 2. In addition, a process of loading a reference signal of an active antenna port into each time-frequency unit in the resource unit and a process of loading reference signals of a plurality of active antenna ports into the same time-frequency unit by using the orthogonal cover code in a Code Division Multiple Access manner are clearly described in the prior art (such as an LTE related standard), and therefore details are not described herein.

Optionally, when the single symbol or each of the plurality of consecutive symbols carries a plurality of reference signals, at least two reference signals are carried on at least two subcarriers in a CDM manner.

Figure 4C:
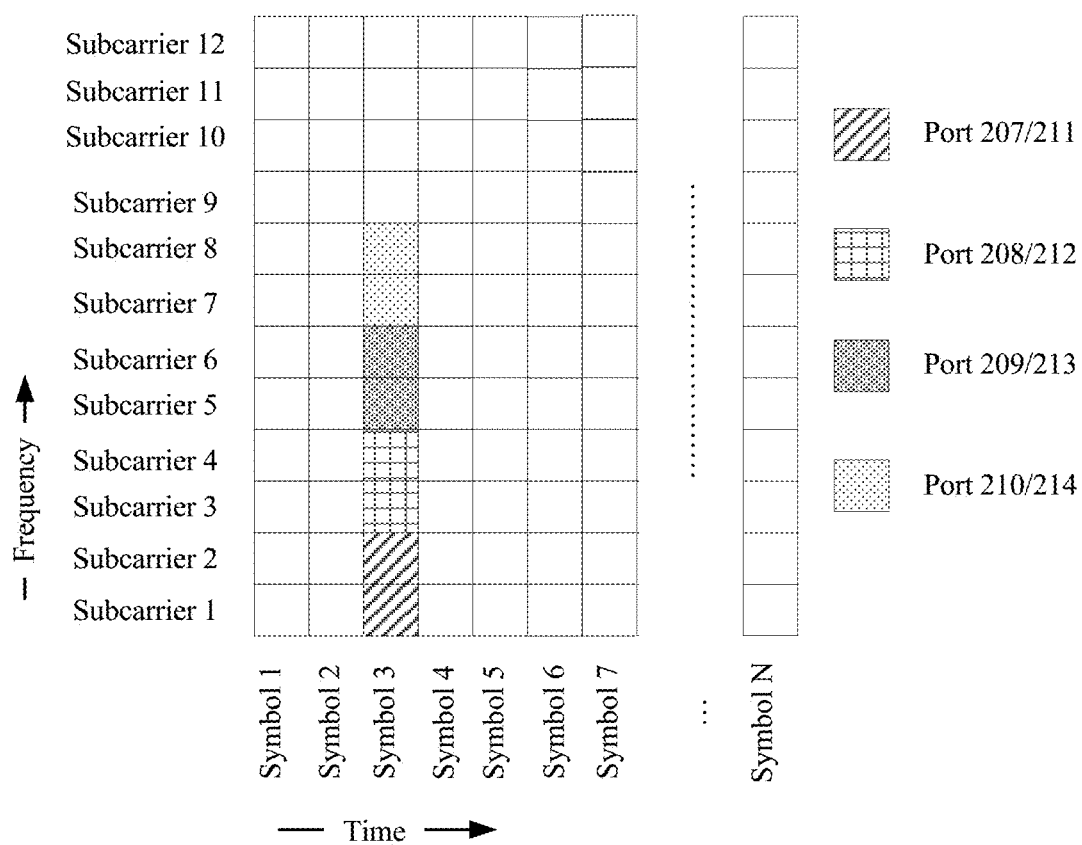
FIG. 4C is a schematic diagram of a pilot pattern of another reference signal according to an embodiment of the present invention.

For example, FIG. 4C is a schematic diagram of a pilot pattern of another reference signal according to an embodiment of the present invention. In FIG. 4C, the resource unit includes 8 reference signals corresponding to 8 active antenna ports, and port numbers of the 8 active antenna ports are 207, 208, 209, 210, 211, 212, 213, and 214. Different colors represent time-frequency units occupied by different active antenna ports, and the time-frequency units are configured to carry demodulation reference signals of different active antenna ports. A reference signal of an active antenna port 207 and a reference signal of an active antenna port 211 occupy a same time-frequency unit and are carried on two consecutive subcarriers (a subcarrier 1 and a subcarrier 2) in the CDM manner. Likewise, a reference signal of an active antenna port 208 and a reference signal of an active antenna port 212 occupy a same time-frequency unit and are carried on two consecutive subcarriers (a subcarrier 3 and a subcarrier 4) in the CDM manner. A reference signal of an active antenna port 209 and a reference signal of an active antenna port 213 occupy a same time-frequency unit and are carried on two consecutive subcarriers (a subcarrier 5 and a subcarrier 6) in the CDM manner. A reference signal of an active antenna port 210 and a reference signal of an active antenna port 214 occupy a same time-frequency unit and are carried on two consecutive subcarriers (a subcarrier 7 and a subcarrier 8) in the CDM manner. In addition, the foregoing two consecutive subcarriers (such as the subcarrier 3 and the subcarrier 4) may further carry more reference signals in the CDM manner.

In addition, in a specific implementation process, the orthogonal cover code may be used to implement the foregoing code division multiplexing, and a length of the orthogonal cover code is related to a quantity of reference signals carried in a same time-frequency unit. For example, in the pilot pattern shown in FIG. 4C, the code division multiplexing may be implemented by using an orthogonal cover code with a length of 2.

Optionally, when the single symbol or each of the plurality of consecutive symbols carries a plurality of reference signals, different reference signals occupy different subcarriers on the single symbol or each of the plurality of consecutive symbols; in other words, the plurality of reference signals are carried on a same symbol in a frequency division multiplexing (FDM for short) manner.

For example, in FIG. 4B, each of the two consecutive symbols (namely, the symbol 3 and the symbol 4) carries the 8 reference signals (which are reference signals corresponding to an active antenna port 207 to an active antenna port 214). The reference signal of the active antenna port 207, the reference signal of the active antenna port 208, the reference signal of the active antenna port 209, and the reference signal of the active antenna port 210 are all carried on the same two consecutive symbols (namely, the symbol 3 and the system 4) and are separately carried on different subcarriers. The reference signal of the active antenna port 207 is carried on a subcarrier 1, a subcarrier 5, and a subcarrier 9. The reference signal of the active antenna port 208 is carried on a subcarrier 2, a subcarrier 6, and a subcarrier 10. The reference signal of the active antenna port 209 is carried on a subcarrier 3, a subcarrier 7, and a subcarrier 11. The reference signal of the active antenna port 210 is carried on a subcarrier 4, a subcarrier 8, and a subcarrier 12. Likewise, the reference signal of the active antenna port 211, the reference signal of the active antenna port 212, the reference signal of the active antenna port 213, and the reference signal of the active antenna port 214 are all carried on the same two consecutive symbols (namely, the symbol 3 and the symbol 4) and are respectively carried on different subcarriers. The reference signal of the active antenna port 211 is carried on the subcarrier 1, the subcarrier 5, and the subcarrier 9. The reference signal of the active antenna port 212 is carried on the subcarrier 2, the subcarrier 6, and the subcarrier 10. The reference signal of the active antenna port 213 is carried on the subcarrier 3, the subcarrier 7, and the subcarrier 11. The reference signal of the active antenna port 214 is carried on the subcarrier 4, the subcarrier 8, and the subcarrier 12.

Figure 4D:
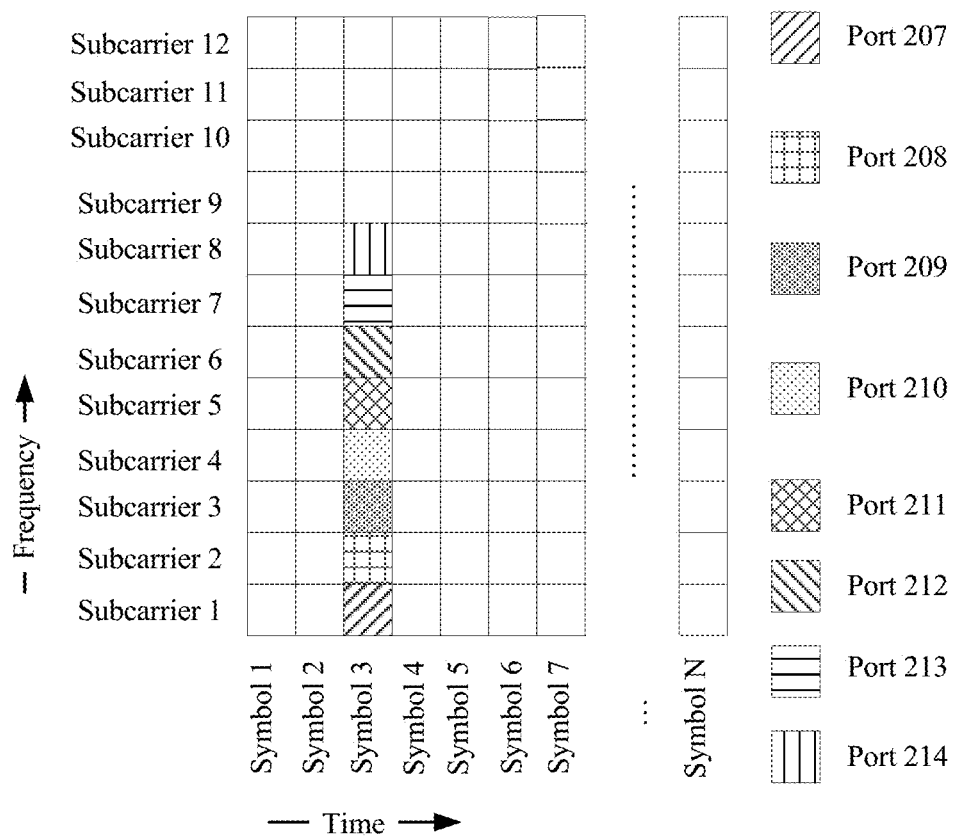
FIG. 4D is a schematic diagram of a pilot pattern of another reference signal according to an embodiment of the present invention.

Alternatively, FIG. 4D is a schematic diagram of a pilot pattern of another reference signal according to an embodiment of the present invention. In FIG. 4D, a single symbol (namely, a symbol 3) carries 8 reference signals (which are reference signals corresponding to an active antenna port 207 to an active antenna port 214). The reference signal of the active antenna port 207 is carried on a subcarrier 1. The reference signal of the active antenna port 208 is carried on a subcarrier 2. The reference signal of the active antenna port 209 is carried on a subcarrier 3. The reference signal of the active antenna port 210 is carried on a subcarrier 4. The reference signal of the active antenna port 211 is carried on a subcarrier 5. The reference signal of the active antenna port 212 is carried on a subcarrier 6. The reference signal of the active antenna port 213 is carried on a subcarrier 7. The reference signal of the active antenna port 214 is carried on a subcarrier 8.

Optionally, when the single symbol or each of the plurality of consecutive symbols carries a plurality of reference signals, at least two reference signals are carried on a same subcarrier on the single symbol or each of the plurality of consecutive symbols by using different local sequences.

Herein, a local sequence is a pilot sequence, in other words, a sequence constituted by pilot symbols mapped to time-frequency units. In other words, different reference signals are mapped to a same time-frequency unit by using different local sequences. The local sequence may be a pseudo-random sequence defined by a Gold sequence with a particular length, initialization is performed by using a pseudo-random sequence initialization parameter $c_{init}$. For any active antenna port, a formula for generating a local sequence is:

$$r(m) = \frac{1}{\sqrt{2}}(1 - 2 \cdot c(2m)) + j\frac{1}{\sqrt{2}}(1 - 2 \cdot c(2m+1)),$$

where c (2m) and c (2m+1) are pseudo-random sequences, and a value of m ranges from 0 to (a total quantity of resource units scheduled by a receive end)×(a quantity of time-frequency units occupied by a reference signal of each active antenna port in each resource unit)−1, and is an integer.

The pseudo-random sequence is generated by a sequence generator, the pseudo-random sequence is generated from the initialization parameter $c_{init}$, and the initialization parameter $c_{init}$ is obtained by using the following formula:

$$c_{init} = (\lfloor n_s/2 \rfloor + 1) \cdot (2n_{ID}^{(nSCID)} + 1) \cdot 2^{16} + n_{SCID}, \text{ where}$$

$n_{SCID}$ represents a scrambling code ID, and different local sequences may be pseudo-random sequences initialized by using different scrambling codes; and different reference signals use different $n_{SCID}$ and therefore local sequences corresponding to different reference signals are different.

Figure 4E:
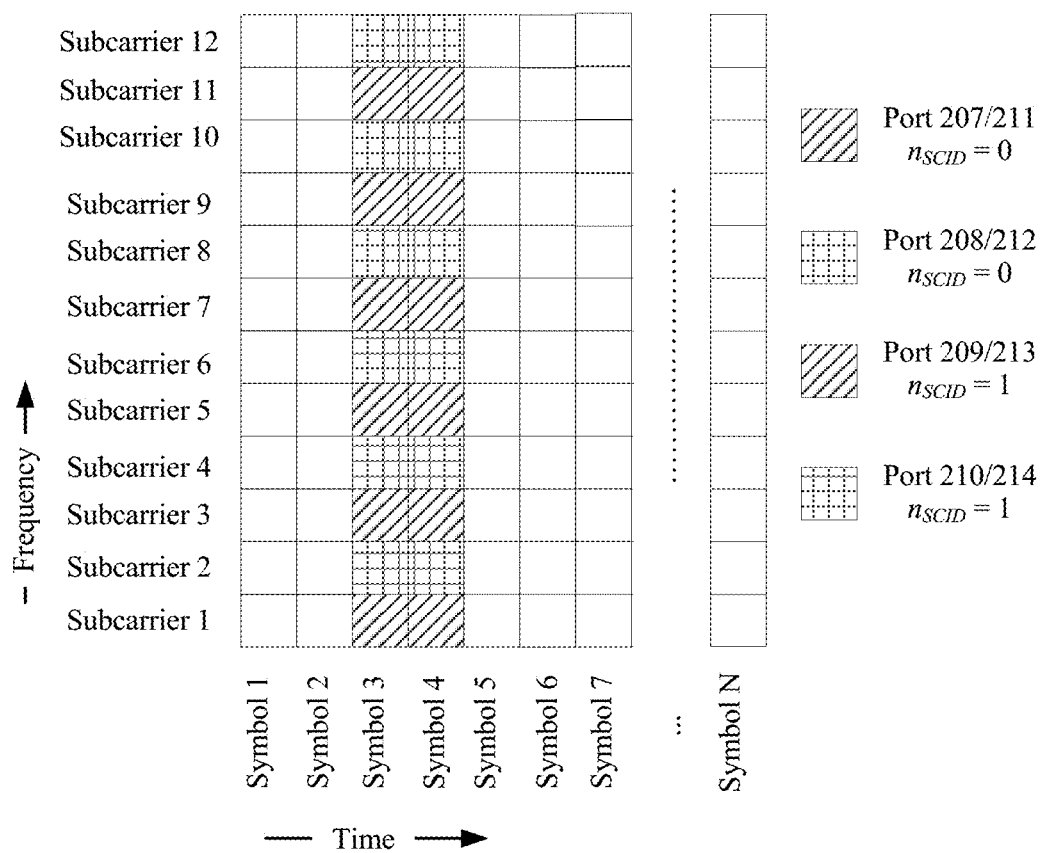
FIG. 4E is a schematic diagram of a pilot pattern of another reference signal according to an embodiment of the present invention.

For example, FIG. 4E is a schematic diagram of a pilot pattern of another reference signal according to an embodiment of the present invention. In FIG. 4E, a reference signal of an active antenna port 207, a reference signal of an active antenna port 209, a reference signal of an active antenna port 211, and a reference signal of an active antenna port 213 are carried in a same time-frequency unit (time domain: a symbol 3 and a symbol 4; and frequency domain: a subcarrier 1, a subcarrier 3, a subcarrier 5, a subcarrier 7, a subcarrier 9, and a subcarrier 11). However, $n_{SCID}$ used by the reference signal of the active antenna port 207 and the reference signal of the active antenna port 211 is 0, and $n_{SCID}$ used by the reference signal of the active antenna port 209 and the reference signal of the active antenna port 213 is 1. The reference signal of the active antenna port 207 and the reference signal of the active antenna port 211 are carried in the same time-frequency unit in a CDM or TDM manner, and the reference signal of the active antenna port 209 and the reference signal of the active antenna port 213 are also carried in the same time-frequency unit in a CDM or TDM manner. Likewise, a reference signal of an active antenna port 208, a reference signal of an active antenna port 210, a reference signal of an active antenna port 212, and a reference signal of an active antenna port 214 are carried in a same time-frequency unit (time domain: the symbol 3 and the symbol 4; and frequency domain: a subcarrier 2, a subcarrier 4, a subcarrier 6, a subcarrier 8, a subcarrier 10, and a subcarrier 12). However, $n_{SCID}$ used by the reference signal of the active antenna port 208 and the reference signal of the active antenna port 212 is 0, and $n_{SCID}$ used by the reference signal of the active antenna port 210 and the reference signal of the active antenna port 214 is 1. The reference signal of the active antenna port 208 and the reference signal of the active antenna port 212 are carried in the same time-frequency unit in a CDM or TDM manner, and the reference signal of the active antenna port 210 and the reference signal of the active antenna port 214 are also carried in the same time-frequency unit in a CDM or TDM manner.

Figure 4F:
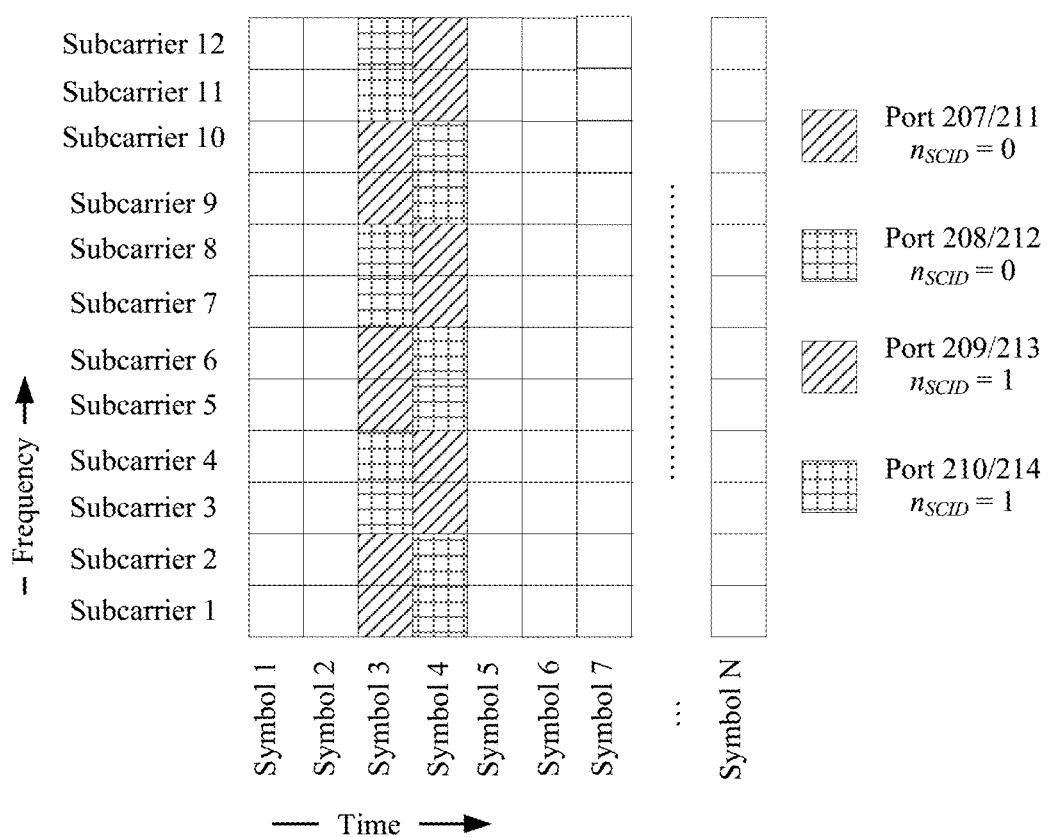
FIG. 4F is a schematic diagram of a pilot pattern of another reference signal according to an embodiment of the present invention.

For another example, FIG. 4F is a schematic diagram of a pilot pattern of another reference signal according to an embodiment of the present invention. In FIG. 4F, a reference signal of an active antenna port 207, a reference signal of an active antenna port 209, a reference signal of an active antenna port 211, and a reference signal of an active antenna port 213 are carried in a same time-frequency unit. However, $n_{SCID}$ used by the reference signal of the active antenna port 207 and the reference signal of the active antenna port 211 is 0, and $n_{SCID}$ used by the reference signal of the active antenna port 209 and the reference signal of the active antenna port 213 is 1. The reference signal of the active antenna port 207 and the reference signal of the active antenna port 211 are carried in the same time-frequency unit in a CDM or an FDM manner, and the reference signal of the active antenna port 209 and the reference signal of the active antenna port 213 are also carried in the same time-frequency unit in a CDM or an FDM manner. Likewise, a reference signal of an active antenna port 208, a reference signal of an active antenna port 210, a reference signal of an active antenna port 212, and a reference signal of an active antenna port 214 are carried in a same time-frequency unit. However, $n_{SCID}$ used by the reference signal of the active antenna port 208 and the reference signal of the active antenna port 212 is 0, and $n_{SCID}$ used by the reference signal of the active antenna port 210 and the reference signal of the active antenna port 214 is 1. The reference signal of the active antenna port 208 and the reference signal of the active antenna port 212 are carried in the same time-frequency unit in a CDM or an FDM manner, and the reference signal of the active antenna port 210 and the reference signal of the active antenna port 214 are also carried in the same time-frequency unit in a CDM or an FDM manner.

It should be noted that when the single symbol or each of the plurality of consecutive symbols carries a plurality of reference signals, the plurality of reference signals may be mapped to the resource unit in at least one of the following multiplexing manners: TDM, CDM, and FDM.

For example, referring to FIG. 4B, the reference signal of the active antenna port 207 and the reference signal of the active antenna port 211 are carried on the same two symbols (namely, the symbol 3 and the symbol 4) in the CDM manner, and are carried on the same sub carriers (namely, the subcarrier 1, the subcarrier 5, and the subcarrier 9). However, the reference signal of the active antenna port 207/211 and the reference signal of the active antenna port 208/212 are carried on different subcarriers in the FDM manner.

Because of a limit of an antenna scale, an antenna scale used in an existing standard and a patent, and a corresponding demodulation reference signal design scheme all support data transmission flows of fewer than 8. For example, in a same time-frequency resource, a maximum of 8 layers of mutually orthogonal demodulation reference signals are multiplexed. However, as an important evolution direction of 5G, a massive MIMO system may sharply increase a system capacity, and this is widely considered to be a necessary solution. Compared with an LTE system, the massive MIMO system more easily enables a system to implement high-rank (Rank>8) transmission, thereby increasing a throughput of a MIMO system.

Therefore, to support high-rank (Rank>8) data transmission, in the solutions provided in the embodiments of the present invention, transmission of more than 8 layers of demodulation reference signals may be supported (for example, layers 1 to 24 are supported).

In addition, in the technical solutions provided in the embodiments of the present invention, a quantity of time-frequency units that carry a reference signal of a same active antenna port in the time-frequency resource may be set based on a quantity of active antenna ports associated with each time-frequency resource. Therefore, in the technical solutions provided in the embodiments of the present invention, resource allocation of the reference signal is more flexible. In the embodiments of the present invention, the quantity of time-frequency units that carry the reference signal of the same active antenna port is adjustable and configurable, and the quantity of time-frequency units that carry the reference signal of the same active antenna port may be set based on the quantity of active antenna ports.

Specifically, in each time-frequency resource, if the quantity of active antenna ports associated with the time-frequency resource is greater than or equal to 1 and less than or equal to 8, the quantity of time-frequency units that carry the reference signal of the same active antenna port is 6. In this case, the pilot pattern of the reference signal in the resource unit may be shown in FIG. 4B.

In the pilot pattern shown in FIG. 4B, the reference signal of the active antenna port 207 and the reference signal of the active antenna port 211 occupy the same time-frequency unit (time domain: the symbol 3 and the symbol 4; and frequency domain: the subcarrier 1, the subcarrier carrier 5, and the subcarrier 9), and are carried in the two symbols in the CDM manner. Likewise, the reference signal of the active antenna port 208 and the reference signal of the active antenna port 212 occupy the same time-frequency unit (time domain: the symbol 3 and the symbol 4; and frequency domain: the subcarrier 2, the subcarrier carrier 6, and the subcarrier 10), and are carried in the two symbols in the CDM manner. The reference signal of the active antenna port 209 and the reference signal of the active antenna port 213 occupy the same time-frequency unit (time domain: the symbol 3 and the symbol 4; and frequency domain: the subcarrier 3, the subcarrier carrier 7, and the subcarrier 11), and are carried in the two symbols in the CDM manner. The reference signal of the active antenna port 210 and the reference signal of the active antenna port 214 occupy the same time-frequency unit (time domain: the symbol 3 and the symbol 4; and frequency domain: the sub carrier 4, the subcarrier carrier 8, and the subcarrier 12), and are carried in the two symbols in the CDM manner. It can be learned from FIG. 4B that, the reference signal corresponding to each active antenna port occupies 6 time-frequency resources (each occupies 2 symbols in time domain and occupies 3 subcarriers in frequency domain), a pilot density corresponding to the pilot pattern shown in FIG. 4B is 6, and the pilot density is a quantity of time-frequency units occupied by a reference signal in the time-frequency resource.

It should be noted that, a lower limit 1 and an upper limit 8 of the quantity of active antenna ports associated with the time-frequency resource, and the quantity 6 of time-frequency units that carry the reference signal of the same active antenna port may be modified to a first value, a second value, and a third value based on a specific requirement.

In addition, in each time-frequency resource, if the quantity of active antenna ports associated with the time-frequency resource is greater than or equal to 9 and less than or equal to 12, the quantity of time-frequency units that carry the reference signal of the same active antenna port is 4. In this case, the pilot pattern of the reference signal in the resource unit may be shown in FIG. 4G.

Figure 4G:
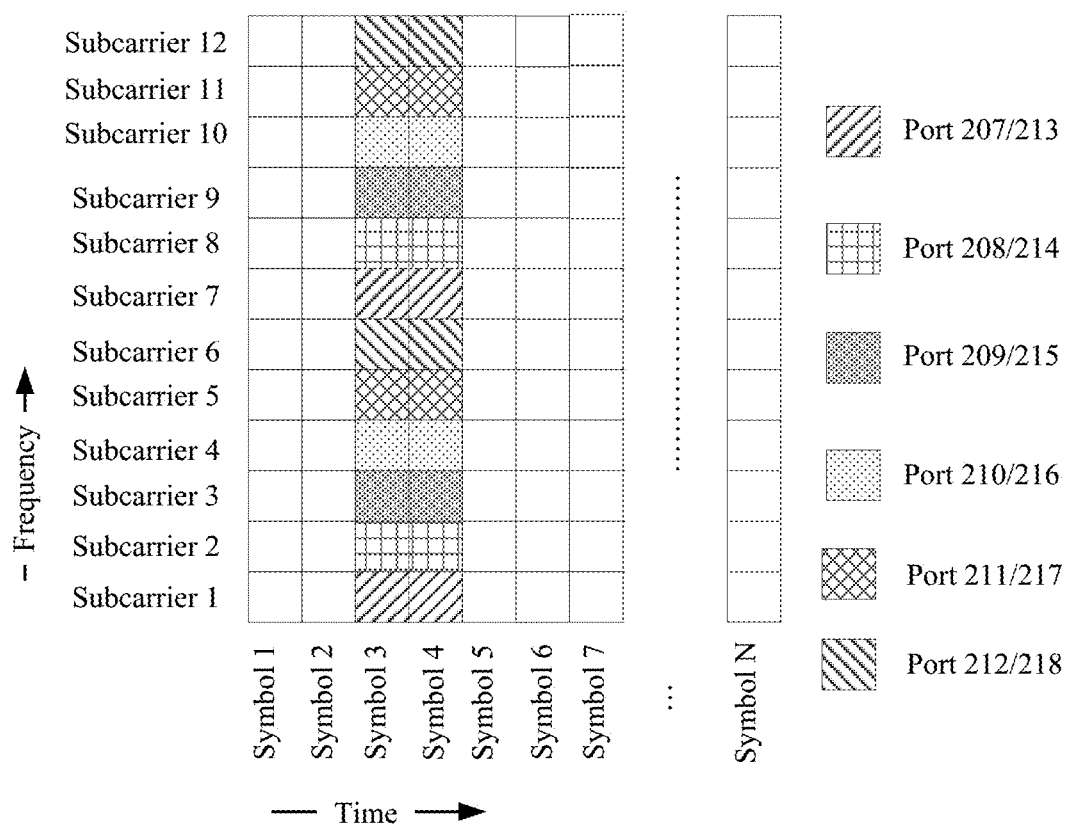
FIG. 4G is a schematic diagram of a pilot pattern of another reference signal according to an embodiment of the present invention.

In the pilot pattern shown in FIG. 4G, a reference signal of an active antenna port 207 and a reference signal of an active antenna port 213 occupy a same time-frequency unit (time domain: a symbol 3 and a symbol 4; and frequency domain: a subcarrier 1 and a subcarrier 7), and are carried in the two symbols in the CDM manner. Likewise, a reference signal of an active antenna port 208 and a reference signal of an active antenna port 214 occupy a same time-frequency unit (time domain: the symbol 3 and the symbol 4; and frequency domain: a subcarrier 2 and a subcarrier 8), and are carried in the two symbols in the CDM manner. A reference signal of an active antenna port 209 and a reference signal of an active antenna port 215 occupy a same time-frequency unit (time domain: the symbol 3 and the symbol 4; and frequency domain: a subcarrier 3 and a subcarrier 9), and are carried in the two symbols in the CDM manner. A reference signal of an active antenna port 210 and a reference signal of an active antenna port 216 occupy a same time-frequency unit (time domain: the symbol 3 and the symbol 4; and frequency domain: a subcarrier 4 and a subcarrier 10), and are carried in the two symbols in the CDM manner. A reference signal of an active antenna port 211 and a reference signal of an active antenna port 217 occupy a same time-frequency unit (time domain: the symbol 3 and the symbol 4; and frequency domain: a subcarrier 5 and a subcarrier 11), and are carried in the two symbols in the CDM manner. A reference signal of an active antenna port 212 and a reference signal of an active antenna port 218 occupy a same time-frequency unit (time domain: the symbol 3 and the symbol 4; and frequency domain: a subcarrier 6 and a subcarrier 12), and are carried in the two symbols in the CDM manner. It can be learned from FIG. 4G that, the reference signal corresponding to each active antenna port occupies 4 time-frequency resources (each occupies 2 symbols in time domain and occupies 2 subcarriers in frequency domain), and a pilot density corresponding to the pilot pattern shown in FIG. 4G is 4.

It should be noted that, a lower limit 9 and an upper limit 12 of the quantity of active antenna ports associated with the time-frequency resource, and the quantity 4 of time-frequency units that carry the reference signal of the same active antenna port may be modified to a fourth value, a fifth value, and a sixth value based on a specific requirement.

In addition, in each time-frequency resource, if the quantity of active antenna ports associated with the time-frequency resource is greater than or equal to 13 and less than or equal to 24, the quantity of time-frequency units that carry the reference signal of the same active antenna port is 2. In this case, the pilot pattern of the reference signal in the resource unit may be shown in FIG. 4H.

Figure 4H:
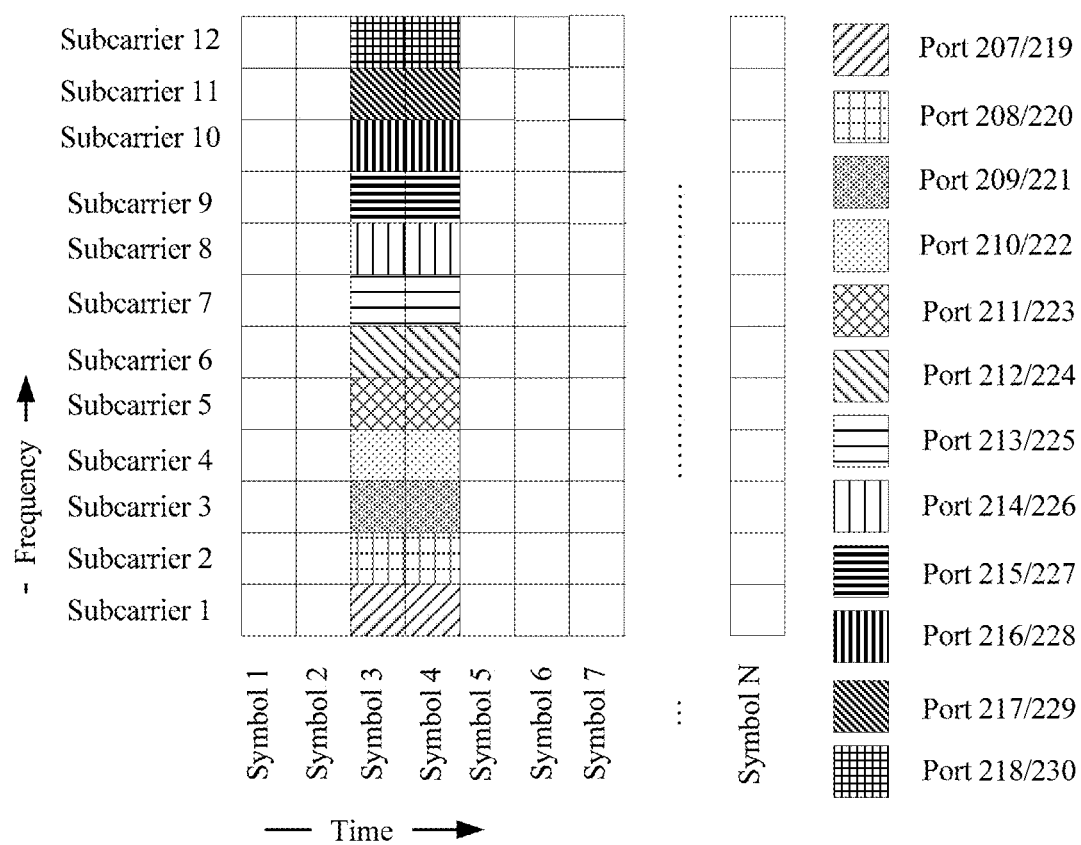
FIG. 4H is a schematic diagram of a pilot pattern of another reference signal according to an embodiment of the present invention.

In the pilot pattern shown in FIG. 4H, a reference signal of an active antenna port 207 and a reference signal of an active antenna port 219 occupy a same time-frequency unit (time domain: a symbol 3 and a symbol 4; and frequency domain: a subcarrier 1), and are carried in the two symbols in the CDM manner. Likewise, a reference signal of an active antenna port 208 and a reference signal of an active antenna port 220 occupy a same time-frequency unit (time domain: the symbol 3 and the symbol 4; and frequency domain: a subcarrier 2), and are carried in the two symbols in the CDM manner. A reference signal of an active antenna port 209 and a reference signal of an active antenna port 221 occupy a same time-frequency unit (time domain: the symbol 3 and the symbol 4; and frequency domain: a subcarrier 3), and are carried in the two symbols in the CDM manner.

A reference signal of an active antenna port 210 and a reference signal of an active antenna port 222 occupy a same time-frequency unit (time domain: the symbol 3 and the symbol 4; and frequency domain: a subcarrier 4), and are carried in the two symbols in the CDM manner. A reference signal of an active antenna port 211 and a reference signal of an active antenna port 223 occupy a same time-frequency unit (time domain: the symbol 3 and the symbol 4; and frequency domain: a subcarrier 5), and are carried in the two symbols in the CDM manner. A reference signal of an active antenna port 212 and a reference signal of an active antenna port 224 occupy a same time-frequency unit (time domain: the symbol 3 and the symbol 4; and frequency domain: a subcarrier 6), and are carried in the two symbols in the CDM manner. A reference signal of an active antenna port 213 and a reference signal of an active antenna port 225 occupy a same time-frequency unit (time domain: the symbol 3 and the symbol 4; and frequency domain: a subcarrier 7), and are carried on the two symbols in the CDM manner. A reference signal of an active antenna port 214 and a reference signal of an active antenna port 226 occupy a same time-frequency unit (time domain: the symbol 3 and the symbol 4; and frequency domain: a subcarrier 8), and are carried in the two symbols in the CDM manner. A reference signal of an active antenna port 215 and a reference signal of an active antenna port 227 occupy a same time-frequency unit (time domain: the symbol 3 and the symbol 4; and frequency domain: a subcarrier 9), and are carried in the two symbols in the CDM manner. A reference signal of an active antenna port 216 and a reference signal of an active antenna port 228 occupy a same time-frequency unit (time domain: the symbol 3 and the symbol 4; and frequency domain: a subcarrier 10), and are carried in the two symbols in the CDM manner. A reference signal of an active antenna port 217 and a reference signal of an active antenna port 229 occupy a same time-frequency unit (time domain: the symbol 3 and the symbol 4; and frequency domain: a subcarrier 11), and are carried in the two symbols in the CDM manner. A reference signal of an active antenna port 218 and a reference signal of an active antenna port 230 occupy a same time-frequency unit (time domain: the symbol 3 and the symbol 4; and frequency domain: a subcarrier 12), and are carried in the two symbols in the CDM manner. It can be learned from FIG. 4H that, the reference signal corresponding to each active antenna port occupies 2 time-frequency resources (each occupies 2 symbols in time domain and occupies 1 subcarrier in frequency domain), and a pilot density corresponding to the pilot pattern shown in FIG. 4H is 2.

It should be noted that, a lower limit 13 and an upper limit 24 of the quantity of active antenna ports associated with the time-frequency resource, and the quantity 2 of time-frequency units that carry the reference signal of the same active antenna port may be modified to a seventh value, an eighth value, and a ninth value based on a specific requirement.

It can be learned from FIG. 4B, FIG. 4G, and FIG. 4H that, when total overheads for the time-frequency resource are unchanged (for example, in FIG. 4B, FIG. 4G, and FIG. 4H, overheads for the time-frequency unit are 24), the quantity of time-frequency units that carry the reference signal of the same active antenna port decreases as the quantity of active antenna ports associated with the time-frequency resource increases, and increases as the quantity of active antenna ports associated with the time-frequency resource decreases.

Optionally, when the total overheads for the time-frequency resource are not limited, the quantity of time-frequency units that carry the reference signal of the same active antenna port may be not limited, and may decrease as the quantity of active antenna ports associated with the time-frequency resource increases, or may increase as the quantity of active antenna ports associated with the time-frequency resource increases.

In the technical solutions provided in the embodiments of the present invention, the quantity of time-frequency units that carry the reference signal of the same active antenna port in the time-frequency resource may be set based on the quantity of active antenna ports associated with each time-frequency resource. Therefore, in the technical solutions provided in the embodiments of the present invention, resource allocation of the reference signal is more flexible. When there are a relatively large quantity of active antenna ports, a larger quantity of active antenna ports may be supported by reducing the quantity of time-frequency units that carry the same reference signal. When there are a relatively small quantity of active antenna ports, higher channel estimation precision may be obtained by increasing the quantity of time-frequency units that carry the same reference signal.

Optionally, in the time-frequency resource, quantities of time-frequency units that carry reference signals of different active antennas may be the same or may be different, so that a mapping rule of the reference signal is more flexible.

Figure 4I:
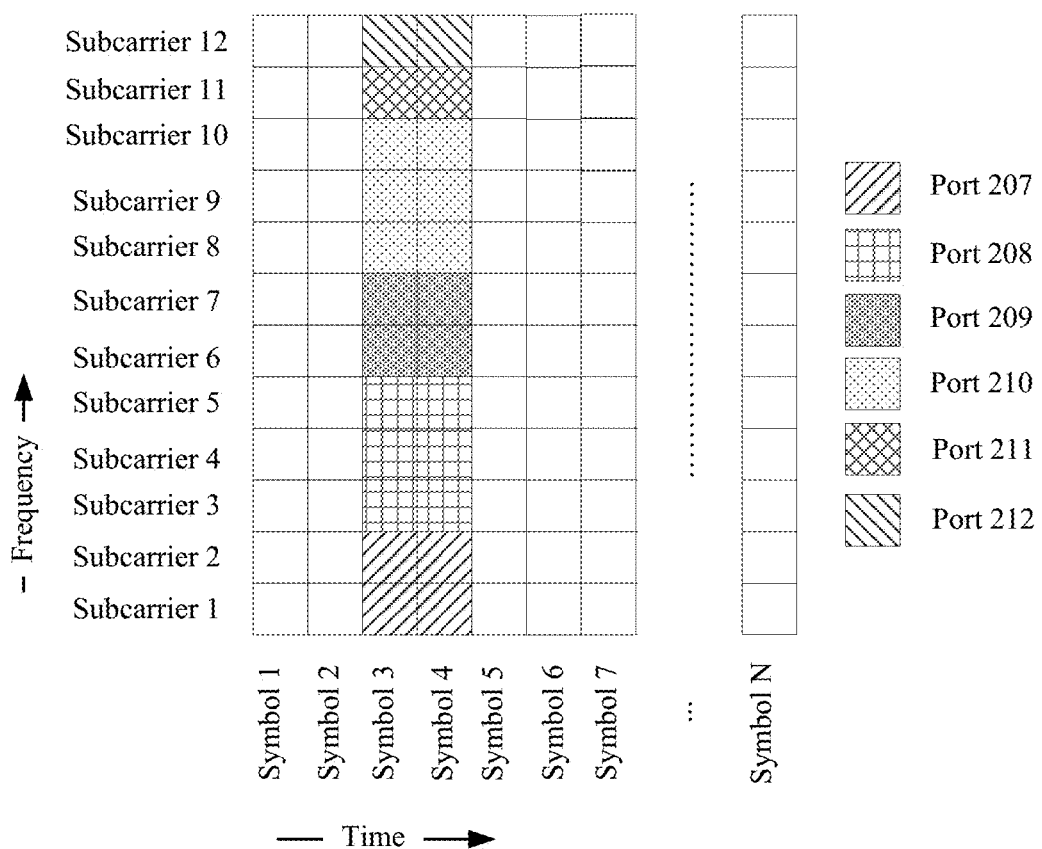
FIG. 4I is a schematic diagram of a pilot pattern of another reference signal according to an embodiment of the present invention.

For example, FIG. 4I is a schematic diagram of a pilot pattern of another reference signal according to an embodiment of the present invention. In FIG. 4I, a quantity of time-frequency units that carry a reference signal of an active antenna port 207 is 4 (time domain: a symbol 3 and a symbol 4; and frequency domain: a subcarrier 1 and a subcarrier 2). A quantity of time-frequency units that carry a reference signal of an active antenna port 208 is 6 (time domain: the symbol 3 and the symbol 4; and frequency domain: a subcarrier 3, a subcarrier 4, and a subcarrier 5). A quantity of time-frequency units that carry a reference signal of an active antenna port 209 is 4 (time domain: the symbol 3 and the symbol 4; and frequency domain: a subcarrier 6 and a subcarrier 7). A quantity of time-frequency units that carry a reference signal of an active antenna port 210 is 6 (time domain: the symbol 3 and the symbol 4; and frequency domain: a subcarrier 8, a subcarrier 9, and a subcarrier 10). A quantity of time-frequency units that carry a reference signal of an active antenna port 211 is 2 (time domain: the symbol 3 and the symbol 4; and frequency domain: a subcarrier 11). A quantity of time-frequency units that carry a reference signal of an active antenna port 212 is 2 (time domain: the symbol 3 and the symbol 4; and frequency domain: a subcarrier 12).

In addition, the quantity of time-frequency units that carry the reference signal of the same active antenna port in the time-frequency resource may be set based on current channel quality of the transmit end device. When the channel quality deteriorates (for example, channel environment fluctuation is high), the quantity of active antenna ports decreases. In this case, more time-frequency units may be allocated to a demodulation reference signal corresponding to each active antenna port, so as to improve channel estimation precision. When the channel quality becomes better (for example, channel environment fluctuation is low), the quantity of active antenna ports increases. In this case, a relatively small quantity of time-frequency units may be allocated to a demodulation reference signal corresponding to each active antenna port, so as to support transmission of more reference signals and also ensure channel estimation precision. In this embodiment of the present invention, the quantity of time-frequency units that carry the reference signal of the same active antenna port is adjustable and configurable, and the quantity of time-frequency units that carry the reference signal of the same active antenna port may be set based on the channel quality.

Support for a pilot density-adjustable feature is mainly to improve resource utilization while ensuring the channel estimation precision, for example, coarse information estimation does not need a high density, otherwise a resource is wasted and overheads increase. However, for a high transmission precision requirement, a density may be improved to achieve a beneficial effect.

Optionally, the transmit end device maps the at least one reference signal to the time-frequency resource based on a pilot density, and the transmit end device sends indication information (to be specific, the indication information about a quantity of time-frequency units occupied by each reference signal) to the receive end device. Therefore, the receive end device determines, based on the indication information, the quantity of time-frequency units occupied by each reference signal, and further can automatically match a pilot pattern of a reference signal sent by the transmit end device (different pilot densities are corresponding to different pilot patterns, and pilot patterns need to be the same at a transmit end and a receive end; otherwise, estimation cannot be performed or an estimation error occurs). Specifically, the transmit end device may send the indication information about the quantity to the receive end device in a signaling manner. For example, the transmit end device adds the indication information about the quantity to a radio resource control (RRC for short) message, and sends, to the receive end device, the RRC message to which the indication information about the quantity is added; or the transmit end device adds the indication information about the quantity to downlink control information (DCI for short) information, and sends, to the receive end device, the DCI information to which the indication information about the quantity is added.

Optionally, the transmit end device and the receive end device may pre-store a plurality of pilot patterns, the transmit end device maps the at least one reference signal to the time-frequency resource based on a pilot density, and the transmit end device sends indication information to the receive end device. Therefore, the receive end device determines, based on the indication information, which pilot pattern is used by the transmit end device, and further can correctly receive each reference signal. The indication information may include but is not limited to an identifier of a pilot pattern, a quantity of reference signals, and a maximum value of an active antenna port sequence number. Specifically, the transmit end device may send the indication information to the receive end device in a signaling manner. For example, the transmit end device adds the indication information to an RRC message, and sends, to the receive end device, the RRC message to which the indication information is added; or the transmit end device adds the indication information to DCI information, and sends, to the receive end device, the DCI information to which the indication information is added. For example, both the transmit end device and the receive end device store the three pilot patterns shown in FIG. 4B, FIG. 4G, and FIG. 4H. It is assumed that identifiers of the three pilot patterns are respectively a pattern 1, a pattern 2, and a pattern 3. If the transmit end device uses the pilot pattern shown in FIG. 4B to map the reference signals of the 8 active antenna ports, the transmit end device may send the identifier pattern 1 of the pilot pattern to the receive end device, so that the receive end device determines, based on the identifier of the pilot pattern, that each reference signal is received based on the pilot pattern shown in FIG. 4B; or the transmit end device sends the quantity 8 of reference signals to the receive end device, so that the receive end device determines, based on the quantity of reference signals, that each reference signal is received based on the pilot pattern shown in FIG. 4B; or the transmit end device sends the maximum value 214 of the active antenna port sequence number to the receive end device, so that the receive end device determines, based on the maximum value of the active antenna port sequence number, that each reference signal is received based on the pilot pattern shown in FIG. 4B.

Optionally, this embodiment of the present invention has backward compatibility (higher-order is compatible with low-order data transmission). For example, FIG. 4B is used as an example for description. In FIG. 4B, the quantity of active antenna ports is 8 (the port numbers are 207, 208, 209, 210, 211, 212, 213, and 214), in other words, the quantity of reference signals is 8. When the quantity of active antenna ports is 4 (such as 207, 208, 211, and 212), the pilot pattern shown in FIG. 4B may continue to be used. To be specific, the reference signal of the active antenna port 207 and the reference signal of the active antenna port 211 occupy the same time-frequency unit (time domain: the symbol 3 and the symbol 4; and frequency domain: the subcarrier 1, the subcarrier 5, and the subcarrier 9), and are carried in the two symbols in the CDM manner. Likewise, the reference signal of the active antenna port 208 and the reference signal of the active antenna port 212 occupy the same time-frequency unit (time domain: the symbol 3 and the symbol 4; and frequency domain: the subcarrier 2, the subcarrier 6, and the subcarrier 10), and are carried in the two symbols in the CDM manner.

S402. The transmit end device sends the reference signal to a receive end device by using the determined time-frequency resource.

S403. The receive end device demodulates a data signal corresponding to the reference signal based on the reference signal corresponding to the receive end device.

Specifically, the receive end device may learn of, based on the DCI information sent by the transmit end device, specific active antenna ports corresponding to the receive end device, so as to determine specific reference signals corresponding to the receive end device, and further receive, by using the time-frequency resource, at least one reference signal corresponding to the receive end device.

The receive end device restores a channel of a pilot location of each reference signal based on the received demodulation reference signal and information such as a transmission order and an antenna configuration of the receive end device. In this process, a local sequence used when the transmit end device generates the demodulation reference signal is known to the receive end device.

The receive end device obtains a channel of a time-frequency location in which the data signal is located, based on the information such as the transmission order and an antenna configuration of a terminal, a channel estimate of the demodulation reference signal obtained in a previous step, and a channel estimation algorithm, and the channel estimation algorithm includes but is not limited to linear interpolation and Wiener filtering. The receive end device demodulates user data based on the restored data channel.

Optionally, the receive end device may further determine, from the pre-stored plurality of pilot patterns based on the indication information (such as pilot pattern indication information, the quantity of time-frequency units that carry the same reference signal, the quantity of reference signals, and the maximum value of the active antenna port number) sent by the transmit end device, and the like, the pilot pattern used by the transmit end device, and then receive each reference signal from the resource unit based on the determined pilot pattern.

In conclusion, the plurality of demodulation reference signals are centrally mapped on the resource unit, and the mapping location of the reference signal is in front of the mapping location of the data signal. This is more suitable for the low-delay frame structure in the NR. This design scheme allows the data demodulation to be more time-effective, and in addition, ensures that the higher channel estimation precision can be obtained in the new reference signal mapping solution, regardless of the low-speed scenario or the high-speed scenario. In addition, the design scheme in this embodiment of the present invention extends the quantity of active antenna ports. Therefore, the quantity of active antenna ports can be greater than 8, and the higher number of data transmission flows can be supported, thereby improving data transmission efficiency. In addition, in this embodiment of the present invention, the quantity of time-frequency units that carry the same reference signal is adjustable or configurable, the quantity of time-frequency units that carry the same reference signal may be associated with the quantity of active antenna ports, and the quantity of time-frequency units that carry the same reference signal may also be associated with the channel quality.

To better implement the reference signal transmission method in the embodiments of the present invention, the embodiments of the present invention further provide a related device for implementing the method.

Figure 5:
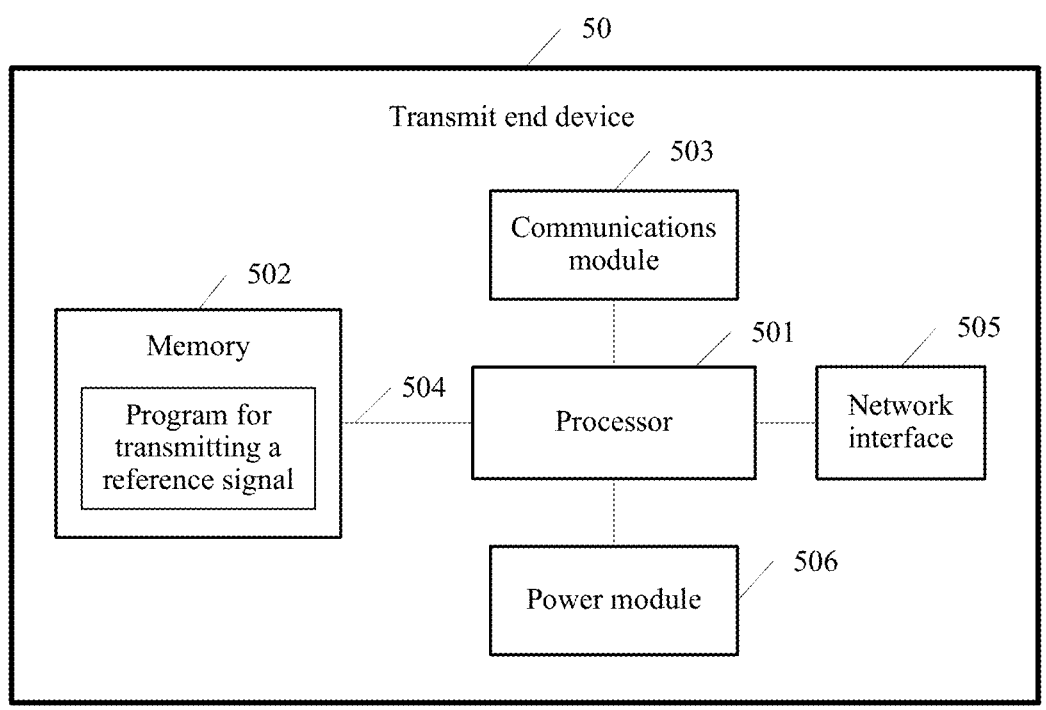
FIG. 5 is a schematic structural diagram of a transmit end device according to an embodiment of the present invention.

FIG. 5 is a schematic structural diagram of a transmit end device according to an embodiment of the present invention. As shown in FIG. 5, in this embodiment of the present invention, an example in which the transmit end device is an access network device is used for description. The transmit end device 50 includes a processor 501, a memory 502, a communications module 503, and a bus 504. The processor 501, the memory 502, and the communications module 503 may be connected by using a bus or in another manner. In FIG. 5, an example in which the processor 501, the memory 502, and the communications module 503 are connected by using the bus 504 is used.

Optionally, the transmit end device 50 may further include a network interface 505 and a power module 506.

The processor 501 may be a digital signal processing (DSP for short) chip. The processor 501 is configured to: manage a radio channel, control cross-zone handover of user equipment in a local control zone, and the like. In specific implementation, the processor 501 may include modules such as an AM/CM module (a center for speech channel switchover and information exchange), a BM module (configured to complete call processing, signaling processing, radio resource management, radio link management, and circuit maintenance functions), and a TCSM module (configured to complete multiplexing/demultiplexing and code conversion functions). For detailed information, refer to related knowledge about mobile communications.

The memory 502 is configured to store program code for transmitting a reference signal. In specific implementation, the memory 502 may use a read-only memory (ROM for short) or a random access memory (RAM for short), and may be configured to store the program code.

The communications module 503 is configured to perform transmission processing on (for example, modulate) a mobile communication signal generated by the processor 501, and is further configured to perform receiving processing on (for example, demodulate) a mobile communication signal received by an antenna.

The bus 504 may be an industry standard architecture (ISA for short) bus, a peripheral component interconnect (PCI for short) bus, an extended industry standard architecture (EISA for short) bus, an inter integrated circuit (IIC for short) bus, or the like.

The network interface 505 is used by the transmit end device 50 to perform data communication with a terminal (a mobile station MS in 2G, or UE in 3G and 4G). In specific implementation, the network interface 505 may include one or more of a GSM (2G) wireless network interface, a WCDMA (3G) wireless network interface, an LTE (4G) wireless network interface, and the like; or may be a future 4.5G or 5G wireless network interface.

The power module 506 is configured to supply power to the modules of the transmit end device 50.

In this embodiment of the present invention, the processor 501 is further configured to invoke the program code in the memory 502, to perform the following operations:

The processor 501 determines a time-frequency resource occupied by at least one reference signal in at least one resource unit, where each of the at least one resource unit includes a first part and a second part, the first part and the second part occupy different symbols, any symbol occupied by the first part is in front of any symbol occupied by the second part, the time-frequency resource is located in a single symbol or a plurality of consecutive symbols in the first part, the second part carries a data signal corresponding to each of the at least one reference signal, and each reference signal is used to demodulate the data signal corresponding to the reference signal; and the processor 501 sends the reference signal to a receive end device by using the determined time-frequency resource and by using the communications module 503.

By performing the foregoing operations, a plurality of demodulation reference signals are centrally mapped on the resource unit, and a mapping location of the reference signal is in front of a mapping location of the data signal. This is more suitable for a low-delay frame structure in NR. This design scheme allows data demodulation to be more time-effective.

It should be noted that, the transmit end device 50 may be applicable to a 2G communications system (for example, a GSM), a 3G communications system (for example, a UMTS), and a 4G communications system (for example, LTE), and may also be applicable to a future 4.5G or 5G communications system.

Optionally, when the plurality of consecutive symbols carry a plurality of reference signals, at least two reference signals are carried on at least two consecutive symbols in a time division multiplexing manner.

Optionally, when the plurality of consecutive symbols carry a plurality of reference signals, at least two reference signals are carried on at least two consecutive symbols in a code division multiplexing manner.

Optionally, when the single symbol or each of the plurality of consecutive symbols carries a plurality of reference signals, at least two reference signals are carried on at least two subcarriers in a code division multiplexing manner.

Optionally, when the single symbol or each of the plurality of consecutive symbols carries a plurality of reference signals, different reference signals occupy different subcarriers on the single symbol or each of the plurality of consecutive symbols.

Optionally, when the single symbol or each of the plurality of consecutive symbols carries a plurality of reference signals, at least two reference signals are carried on a same subcarrier on the single symbol or each of the plurality of consecutive symbols by using different local sequences.

Optionally, the time-frequency resource includes a plurality of time-frequency units, and in the time-frequency resource, a quantity of time-frequency units that carry a reference signal of a same active antenna port is associated with a quantity of active antenna ports associated with the time-frequency resource. In this embodiment of the present invention, the quantity of time-frequency units that carry the reference signal of the same active antenna port is adjustable and configurable, and the quantity of time-frequency units that carry the reference signal of the same active antenna port may be set based on the quantity of active antenna ports.

Optionally, the time-frequency resource includes a plurality of time-frequency units, and in the time-frequency resource, quantities of time-frequency units that carry reference signals of different active antenna ports are the same or different.

Optionally, the time-frequency resource includes a plurality of time-frequency units, and in the time-frequency resource, a quantity of time-frequency units that carry a reference signal of a same active antenna port is associated with current channel quality of the transmit end device. In this embodiment of the present invention, the quantity of time-frequency units that carry the reference signal of the same active antenna port is adjustable and configurable, and the quantity of time-frequency units that carry the reference signal of the same active antenna port may be set based on the channel quality.

Optionally, the time-frequency resource includes a plurality of time-frequency units; and after the processor 501 determines the time-frequency resource occupied by the at least one reference signal in the at least one resource unit, before sending the reference signal to the receive end device by using the determined time-frequency resource and by using the communications module 503, the processor 501 is further configured to:

configure the at least one reference signal on the time-frequency resource based on a quantity of time-frequency units that carry each reference signal.

The processor 501 is further configured to send indication information to the receive end device by using the communications module 503, and the indication information is used by the receive end device to determine the quantity of time-frequency units that carry each of the at least one reference signal on the time-frequency resource.

Optionally, that the processor 501 sends indication information to the receive end device by using the communications module 503 includes: adding, by the processor 501, the indication information to an RRC message by using the communications module 503, and sending, to the receive end device, the RRC message to which the indication information is added; or adding, by the processor 501, the indication information to DCI by using the communications module 503, and sending, to the receive end device, the DCI to which the indication information is added.

Optionally, the indication information includes the quantity of time-frequency units that carry each reference signal, an identifier of a pilot pattern, a quantity of reference signals, or a maximum value of an active antenna port sequence number.

It should be noted that, functions of the function modules of the transmit end device 50 described in this embodiment of the present invention may be implemented based on the related descriptions of the corresponding transmit end device in the embodiment shown in FIG. 4. Details are not described herein again.

Figure 6:
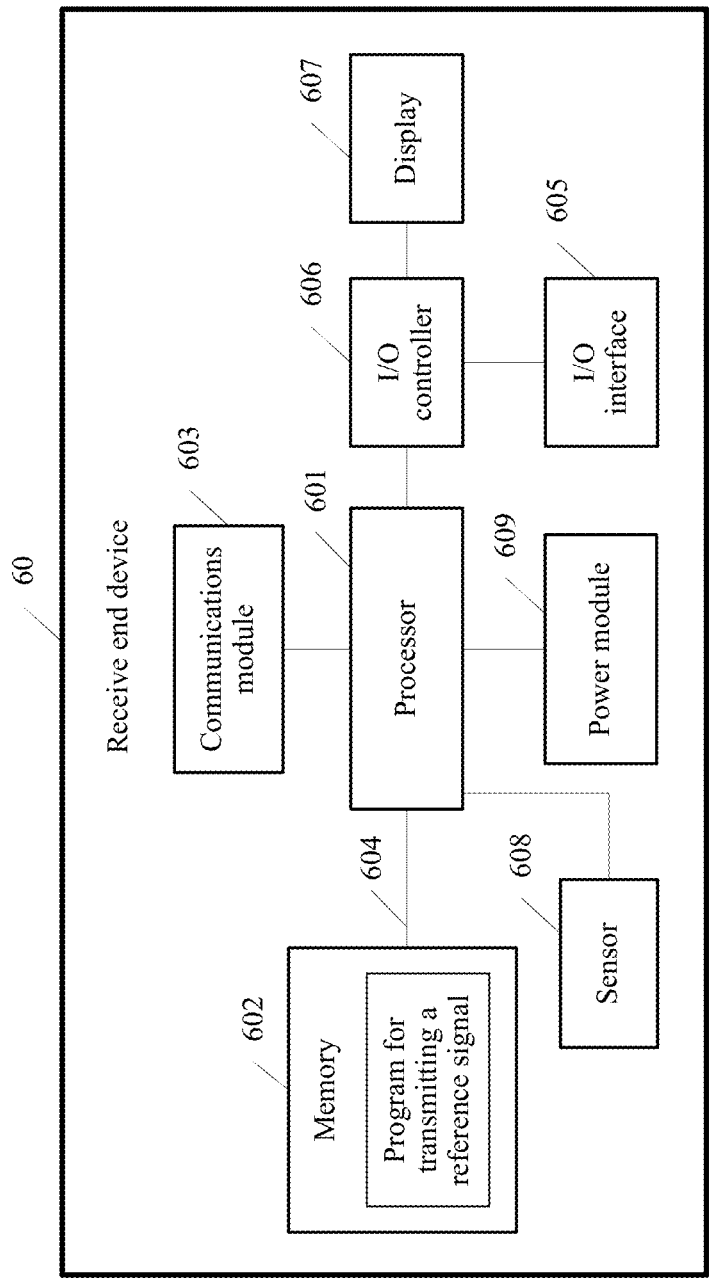
FIG. 6 is a schematic structural diagram of a receive end device according to an embodiment of the present invention.

FIG. 6 is a schematic structural diagram of a receive end device according to an embodiment of the present invention. As shown in FIG. 6, in this embodiment of the present invention, an example in which the receive end device is user equipment is used for description. The receive end device 60 includes a processor 601, a memory 602, a communications module 603, and a bus 604. The processor 601, the memory 602, and the communications module 603 may be connected by using a bus or in another manner. In FIG. 6, an example in which the processor 601, the memory 602, and the communications module 603 are connected by using the bus 604 is used.

Optionally, the receive end device 60 may further include an input/output (I/O for short) interface 605, an I/O controller 606, a display 607, a sensor 608, and a power module 609.

The processor 601 may be a general purpose processor, for example, a central processing unit (CPU for short), and is configured to run operating system software, required application software, and the like of the receive end device 60. The processor 601 may process data received by using the communications module 603. The processor 601 may further process data to be sent to the communications module 603 for wireless transmission.

The memory 602 is configured to: store program code for transmitting a reference signal, and implement storage of various software programs of the receive end device, data storage, software running, and the like. The memory 602 may include a volatile memory, for example, a RAM. Alternatively, the memory 602 may include a nonvolatile memory, for example, a ROM, a hard disk drive (HDD for short), or a solid-state drive (SSD for short). Alternatively, the memory 602 may include a combination of the foregoing types of memories.

The communications module 603 provides a communication function for the receive end device 60, is configured to perform transmission processing on (for example, amplify, modulate, or encode) a mobile communication signal generated by the processor 601, and is further configured to perform receiving processing on (for example, demodulate or decode) a mobile communication signal received by an antenna. The communications module 603 may be applicable to a cellular network, for example, a GSM, a Universal Mobile Telephone System (UMTS for short), an LTE network, or a CDMA network, and may also be applicable to one or more of a WLAN, a near field communication (NFC for short) network, a Bluetooth network, and the like.

The bus 604 may be an ISA bus, a PCI bus, an EISA bus, an IIC bus, or the like.

The I/O interface 605 is an external interface of the receive end device 60, and includes one or more of a universal serial bus (USB for short) interface, a secure digital card (SD for short) interface, a push-button interface, and the like.

The I/O controller 606 is configured to control data exchange between various input/output devices of the receive end device 60, particularly, data exchange between the processor 601, the I/O interface 605, and the display 607.

The display 607 is a display screen and a touchscreen of the receive end device 60. The display 607 is configured to display a software running status, a power status, time, a user configuration interface, and a configuration result of the receive end device 60. The touchscreen is configured to:

receive a user touch operation and convert the user touch operation into a user operation instruction.

The sensor 608 is various sensor devices, including one or more of a global positioning system (GPS for short) module, a gravity sensor, an acceleration sensor, a distance sensor, a camera, an optical sensor, and the like.

The power module 609 supplies power to the modules of the receive end device 60.

In this embodiment of the present invention, the processor 601 is mainly configured to invoke the program stored in the memory 602, to perform the following operations:

The processor 601 receives, by using a time-frequency resource and by using the communications module 603, a reference signal that is corresponding to the receive end device and that is sent by a transmit end device, where the time-frequency resource is a time-frequency resource occupied by at least one reference signal in at least one resource unit, each of the at least one resource unit includes a first part and a second part, the first part and the second part occupy different symbols, any symbol occupied by the first part is in front of any symbol occupied by the second part, the time-frequency resource is located in a single symbol or a plurality of consecutive symbols in the first part, the second part carries a data signal corresponding to each of the at least one reference signal, and each reference signal is used to demodulate the data signal corresponding to the reference signal; and the processor 601 demodulates the data signal corresponding to the reference signal based on the reference signal corresponding to the receive end device.

By performing the foregoing operations, a plurality of demodulation reference signals are centrally mapped on the resource unit, and a mapping location of the reference signal is in front of a mapping location of the data signal. This is more suitable for a low-delay frame structure in NR. This design scheme allows data demodulation to be more time-effective.

Optionally, when the plurality of consecutive symbols carry a plurality of reference signals, at least two reference signals are carried on at least two consecutive symbols in a time division multiplexing manner.

Optionally, when the plurality of consecutive symbols carry a plurality of reference signals, at least two reference signals are carried on at least two consecutive symbols in a code division multiplexing manner.

Optionally, when the single symbol or each of the plurality of consecutive symbols carries a plurality of reference signals, at least two reference signals are carried on at least two subcarriers in a code division multiplexing manner.

Optionally, when the single symbol or each of the plurality of consecutive symbols carries a plurality of reference signals, different reference signals occupy different subcarriers on the single symbol or each of the plurality of consecutive symbols.

Optionally, when the single symbol or each of the plurality of consecutive symbols carries a plurality of reference signals, at least two reference signals are carried on a same subcarrier on the single symbol or each of the plurality of consecutive symbols by using different local sequences.

Optionally, the time-frequency resource includes a plurality of time-frequency units, and in the time-frequency resource, a quantity of time-frequency units that carry a reference signal of a same active antenna port is associated with a quantity of active antenna ports associated with the time-frequency resource. In this embodiment of the present invention, the quantity of time-frequency units that carry the reference signal of the same active antenna port is adjustable and configurable, and the quantity of time-frequency units that carry the reference signal of the same active antenna port may be set based on the quantity of active antenna ports.

Optionally, the time-frequency resource includes a plurality of time-frequency units, and in the time-frequency resource, quantities of time-frequency units that carry reference signals of different active antenna ports are the same or different.

Optionally, the time-frequency resource includes a plurality of time-frequency units, and in the time-frequency resource, a quantity of time-frequency units that carry a reference signal of a same active antenna port is associated with current channel quality of the transmit end device. In this embodiment of the present invention, the quantity of time-frequency units that carry the reference signal of the same active antenna port is adjustable and configurable, and the quantity of time-frequency units that carry the reference signal of the same active antenna port may be set based on the channel quality.

Optionally, the time-frequency resource includes a plurality of time-frequency units; and the processor 601 is further configured to receive, by using the communications module 603, indication information sent by the transmit end device, and the indication information is used to determine a quantity of time-frequency units that carry each of the at least one reference signal on the time-frequency resource.

Optionally, the receiving, by the communications module 603, indication information sent by the transmit end device includes: receiving, by using the communications module 603, the indication information that is sent by the transmit end device by using an RRC message or DCI.

Optionally, the indication information includes the quantity of time-frequency units that carry each reference signal, an identifier of a pilot pattern, a quantity of reference signals, or a maximum value of an active antenna port sequence number.

It should be noted that, functions of the function modules of the receive end device 60 described in this embodiment of the present invention may be implemented based on the related descriptions of the corresponding receive end device in the embodiment shown in FIG. 4. Details are not described herein again.

Figure 7:
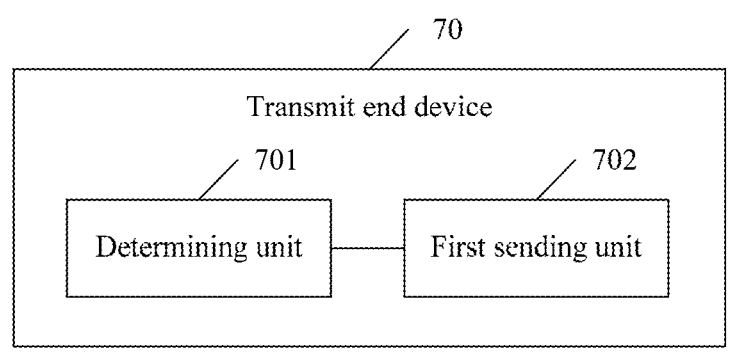
FIG. 7 is a schematic structural diagram of another transmit end device according to an embodiment of the present invention.

FIG. 7 is a schematic structural diagram of another transmit end device according to an embodiment of the present invention. As shown in FIG. 7, the transmit end device 70 includes a determining unit 701 and a first sending unit 702.

The determining unit 701 is configured to determine a time-frequency resource occupied by at least one reference signal in at least one resource unit, where each of the at least one resource unit includes a first part and a second part, the first part and the second part occupy different symbols, any symbol occupied by the first part is in front of any symbol occupied by the second part, the time-frequency resource is located in a single symbol or a plurality of consecutive symbols in the first part, the second part carries a data signal corresponding to each of the at least one reference signal, and each reference signal is used to demodulate the data signal corresponding to the reference signal.

The first sending unit 702 is configured to send the reference signal to a receive end device by using the determined time-frequency resource.

By running the foregoing units, a plurality of demodulation reference signals are centrally mapped on the resource unit, and a mapping location of the reference signal is in front of a mapping location of the data signal. This is more suitable for a low-delay frame structure in NR. This design scheme allows data demodulation to be more time-effective.

In this embodiment, the transmit end device 70 is presented in a form of a function unit. The "unit" herein may be an application-specific integrated circuit (ASIC for short), a processor and a memory that execute one or more software or firmware programs, an integrated logic circuit, and/or another device that can provide the foregoing functions. The transmit end device 70 may use a form shown in FIG. 5. The determining unit 701 and the first sending unit 702 may be implemented by using the processor 501 in FIG. 5.

Optionally, the time-frequency resource includes a plurality of time-frequency units. The transmit end device 70 further includes:

a configuration unit, configured to: after the determining unit 701 determines the time-frequency resource occupied by the at least one reference signal in the at least one resource unit, before the first sending unit 702 sends the reference signal to the receive end device by using the determined time-frequency resource, configure the at least one reference signal on the time-frequency resource based on a quantity of time-frequency units that carry each reference signal.

The transmit end device 70 further includes:

a second sending unit, configured to send indication information to the receive end device, and the indication information is used by the receive end device to determine the quantity of time-frequency units that carry each of the at least one reference signal on the time-frequency resource.

Optionally, the second sending unit is specifically configured to: add the indication information to an RRC message, and send, to the receive end device, the RRC message to which the indication information is added; or add the indication information to DCI, and send, to the receive end device, the DCI to which the indication information is added.

It should be noted that, functions of the function units of the transmit end device 70 described in this embodiment of the present invention may be implemented based on the related descriptions of the transmit end device in the embodiment shown in FIG. 4. Details are not described herein again.

Figure 8:
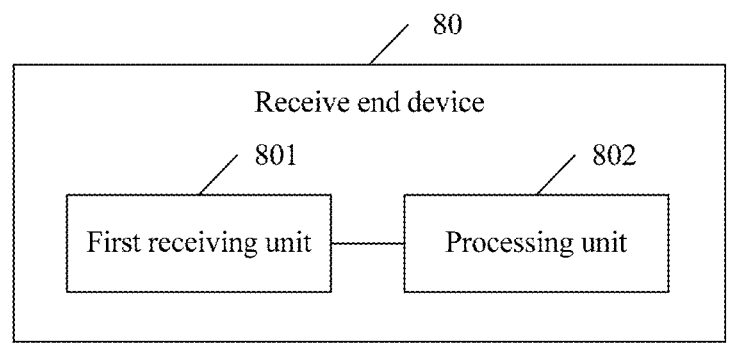
FIG. 8 is a schematic structural diagram of another receive end device according to an embodiment of the present invention.

FIG. 8 is a schematic structural diagram of another receive end device according to an embodiment of the present invention. As shown in FIG. 8, the receive end device 80 includes: a first receiving unit 801 and a processing unit 802.

The first receiving unit 801 is configured to receive, by using a time-frequency resource, a reference signal that is corresponding to the receive end device and that is sent by a transmit end device, where the time-frequency resource is a time-frequency resource occupied by at least one reference signal in at least one resource unit, each of the at least one resource unit includes a first part and a second part, the first part and the second part occupy different symbols, any symbol occupied by the first part is in front of any symbol occupied by the second part, the time-frequency resource is located in a single symbol or a plurality of consecutive symbols in the first part, the second part carries a data signal corresponding to each of the at least one reference signal, and each reference signal is used to demodulate the data signal corresponding to the reference signal.

The processing unit 802 is configured to demodulate the data signal corresponding to the reference signal based on the reference signal corresponding to the receive end device.

By running the foregoing units, a plurality of demodulation reference signals are centrally mapped on the resource unit, and a mapping location of the reference signal is in front of a mapping location of the data signal. This is more suitable for a low-delay frame structure in NR. This design scheme allows data demodulation to be more time-effective.

In this embodiment, the receive end device 80 is presented in a form of a function unit. The "unit" herein may be an ASIC, a processor and a memory that execute one or more software or firmware programs, an integrated logic circuit, and/or another device that can provide the foregoing functions. The receive end device 80 may use a form shown in FIG. 6. The first receiving unit 801 and the processing unit 802 may be implemented by the processor 601 in FIG. 6.

Optionally, the time-frequency resource includes a plurality of time-frequency units. The receive end device 80 further includes:

a second receiving unit, configured to receive indication information sent by the transmit end device, and the indication information is used to determine the quantity of time-frequency units that carry each of the at least one reference signal on the time-frequency resource.

Optionally, the second receiving unit is specifically configured to receive the indication information that is sent by the transmit end device by using an RRC message or DCI.

It should be noted that, functions of the function units of the receive end device 80 described in this embodiment of the present invention may be implemented based on the related descriptions of the receive end device in the embodiment shown in FIG. 4. Details are not described herein again.

To better implement the embodiments of the present invention, an embodiment of the present invention further provides a computer readable storage medium. The computer-readable storage medium stores one or more computer programs. The computer-readable storage medium may be a magnetic disk, a compact disc, a ROM, a RAM, or the like. The one or more computer programs run on one or more processors in a transmit end device. When the computer programs are running, a procedure of the corresponding transmit end device in the method embodiment shown in FIG. 4 may be implemented. The one or more computer programs run on one or more processors in a receive end device. When the computer programs are running, a procedure of the corresponding receive end device in the method embodiment shown in FIG. 4 may be implemented.

Although the embodiments of the present invention are described herein with reference to the embodiments, the scope of the claims of the embodiments of the present invention should not be limited. In a process of implementing the embodiments of the present invention that claims protection, a person skilled in the art may understand and implement all or some procedures in the foregoing embodiments by viewing the accompanying drawings, disclosed content, and the accompanying claims. Equivalent variations made in accordance with the claims of the embodiments of the present invention shall fall within the scope of the present invention. In the claims, "comprising" does not exclude another component or another step, and "a" or "one" does not exclude a case of a plurality of. A single controller or another unit may implement several functions enumerated in the claims. Some measures are recorded in dependent claims that are different from each other, but this does not mean that these measures cannot be combined to produce a better effect. A computer program may be stored/distributed in an appropriate medium such as an optical storage medium or a solid-state medium and be provided together with other hardware or be used as a part of hardware, or may be distributed in another manner, for example, by using the Internet, or another wired or wireless system.

What is claimed is:

1. A reference signal transmission method comprising:
receiving, by a receive end device, using a time-frequency resource, a reference signal that is associated with the receive end device and that is sent by a transmit end device,
wherein the time-frequency resource is occupied by at least one reference signal in at least one resource unit,
wherein each of the at least one resource unit comprises a first part and a second part, the first part and the second part occupy different symbols, and any symbol occupied by the first part is in front of any symbol occupied by the second part,
wherein the time-frequency resource is associated with a quantity of time-frequency units of the at least one resource unit,
wherein the time-frequency units carry a reference signal of an active antenna port,
wherein the quantity of time-frequency units is based on a quantity of active antenna ports associated with the reference signal,
wherein the time-frequency resource is located in the first part of the resource unit, and the second part carries a data signal associated with each of the at least one reference signal, and
wherein each reference signal is used to demodulate the data signal associated with the reference signal; and
demodulating, by the receive end device, the data signal associated with the reference signal based on the reference signal.

2. The method according to claim 1, wherein upon the plurality of consecutive symbols carrying a plurality of reference signals, at least two reference signals are carried on at least two consecutive symbols in a time division multiplexing manner.

3. The method according to claim 1, wherein upon the plurality of consecutive symbols carrying a plurality of reference signals, at least two reference signals are carried on at least two consecutive symbols in a code division multiplexing manner.

4. The method according to claim 1, wherein upon the single symbol or each of the plurality of consecutive symbols carrying a plurality of reference signals, at least two reference signals are carried on at least two subcarriers in a code division multiplexing manner.

5. The method according to claim 1, wherein upon the single symbol or each of the plurality of consecutive symbols carrying a plurality of reference signals, different reference signals occupy different subcarriers on the single symbol or each of the plurality of consecutive symbols.

6. The method according to claim 1, wherein upon the single symbol or each of the plurality of consecutive symbols carrying a plurality of reference signals, at least two reference signals are carried on a same subcarrier on the single symbol or each of the plurality of consecutive symbols by using different local sequences.

7. A receive end device comprising: a processor, a memory, and a communications module, wherein the memory is configured to store program code for transmitting a reference signal, and the processor is configured to execute the program code to perform the following operations:
receiving, by using a time-frequency resource and by using the communications module, a reference signal that is associated with the receive end device and that is sent by a transmit end device,
wherein the time-frequency resource is occupied by at least one reference signal in at least one resource unit,
wherein each of the at least one resource unit comprises a first part and a second part, the first part and the second part occupy different symbols, and any symbol occupied by the first part is in front of any symbol occupied by the second part,
wherein the time-frequency resource is associated with a quantity of time-frequency units of the at least one resource unit,
wherein the time-frequency units carry a reference signal of an active antenna port,
wherein the quantity of time-frequency units is based on a quantity of active antenna ports associated with the reference signal,
wherein the time-frequency resource is located in a single symbol or a plurality of consecutive symbols in the first part, and the second part carries a data signal associated with each of the at least one reference signal, and
wherein each reference signal is used to demodulate the data signal associated with the reference signal; and
demodulating the data signal associated with the reference signal based on the reference signal associated with the receive end device.

8. The receive end device according to claim 7, wherein upon the plurality of consecutive symbols carrying a plurality of reference signals, at least two reference signals are carried on at least two consecutive symbols in a time division multiplexing manner.

9. The receive end device according to claim 7, wherein upon the plurality of consecutive symbols carrying a plurality of reference signals, at least two reference signals are carried on at least two consecutive symbols in a code division multiplexing manner.

10. The receive end device according to claim 7, wherein upon the single symbol or each of the plurality of consecutive symbols carrying a plurality of reference signals, at least two reference signals are carried on at least two subcarriers in a code division multiplexing manner.

11. The receive end device according to claim 7, wherein upon the single symbol or each of the plurality of consecutive symbols carrying a plurality of reference signals, different reference signals occupy different subcarriers on the single symbol or each of the plurality of consecutive symbols.

12. The receive end device according to claim 7, wherein upon the single symbol or each of the plurality of consecutive symbols carrying a plurality of reference signals, at least two reference signals are carried on a same subcarrier on the single symbol or each of the plurality of consecutive symbols by using different local sequences.

13. A non-transitory computer-readable storage medium, comprising a computer program, which when executed by a computer, causes the computer to perform operations including:
receiving, by using a time-frequency resource, a reference signal that is associated with a receive end device and that is sent by a transmit end device,
wherein the time-frequency resource is occupied by at least one reference signal in at least one resource unit,
wherein each of the at least one resource unit comprises a first part and a second part, and the first part and the second part occupy different symbols, any symbol occupied by the first part is in front of any symbol occupied by the second part, wherein the time-frequency resource is associated with a quantity of time-frequency units of the at least one resource unit, wherein the time-frequency units carry a reference signal of an active antenna port, wherein the quantity of time-frequency units is based on a quantity of active antenna ports associated with the reference signal, wherein the time-frequency resource is located in a single symbol or a plurality of consecutive symbols in the first part, and the second part carries a data signal associated with each of the at least one reference signal, and wherein each reference signal is used to demodulate the data signal associated with the reference signal; and demodulating the data signal associated with the reference signal based on the reference signal.

14. The non-transitory computer-readable storage medium according to claim 13, wherein upon the plurality of consecutive symbols carrying a plurality of reference signals, at least two reference signals are carried on at least two consecutive symbols in a time division multiplexing manner.

15. The non-transitory computer-readable storage medium according to claim 13, wherein upon the plurality of consecutive symbols carrying a plurality of reference signals, at least two reference signals are carried on at least two consecutive symbols in a code division multiplexing manner.

16. The non-transitory computer-readable storage medium according to claim 13, wherein upon the single symbol or each of the plurality of consecutive symbols carrying a plurality of reference signals, at least two reference signals are carried on at least two subcarriers in a code division multiplexing manner.

17. The non-transitory computer-readable storage medium according to claim 13, wherein upon the single symbol or each of the plurality of consecutive symbols carrying a plurality of reference signals, different reference signals occupy different subcarriers on the single symbol or each of the plurality of consecutive symbols.

18. The non-transitory computer-readable storage medium according to claim 13, wherein upon the single symbol or each of the plurality of consecutive symbols carrying a plurality of reference signals, at least two reference signals are carried on a same subcarrier on the single symbol or each of the plurality of consecutive symbols by using different local sequences.

* * * * *